(12) United States Patent
Cohen

(10) Patent No.: US 12,311,584 B2
(45) Date of Patent: May 27, 2025

(54) ANGULARLY SEGMENTED HOT MIRROR FOR EYE TRACKING

(71) Applicant: Magic Leap, Inc., Plantation, FL (US)

(72) Inventor: David Cohen, Nesher (IL)

(73) Assignee: Magic Leap, Inc., Plantation, FL (US)

( * ) Notice: Subject to any disclaimer, the term of this patent is extended or adjusted under 35 U.S.C. 154(b) by 387 days.

(21) Appl. No.: 17/630,828

(22) PCT Filed: Jul. 29, 2020

(86) PCT No.: PCT/US2020/044107
§ 371 (c)(1),
(2) Date: Jan. 27, 2022

(87) PCT Pub. No.: WO2021/021957
PCT Pub. Date: Feb. 4, 2021

(65) Prior Publication Data
US 2022/0274299 A1    Sep. 1, 2022

Related U.S. Application Data

(60) Provisional application No. 62/880,499, filed on Jul. 30, 2019.

(51) Int. Cl.
*B29C 45/00* (2006.01)
*B29C 45/16* (2006.01)
(Continued)

(52) U.S. Cl.
CPC ...... *B29C 45/0001* (2013.01); *B29C 45/1615* (2013.01); *B29C 45/1671* (2013.01);
(Continued)

(58) Field of Classification Search
CPC ............ B29C 45/0001; B29C 45/1615; B29C 45/1671; B29D 11/00009; B29D 11/00596; B29D 11/00634; B29D 11/0073
See application file for complete search history.

(56) References Cited

U.S. PATENT DOCUMENTS

| 4,609,266 A | 9/1986 | Blom |
| 6,850,221 B1 | 2/2005 | Tickle |

(Continued)

FOREIGN PATENT DOCUMENTS

| JP | 2005535938 A | 11/2005 |
| JP | 2008528313 A | 7/2008 |

(Continued)

OTHER PUBLICATIONS

Toray, Toray Develops Innovative Solor Control Film Leveraging Advances Made in Nano-Layering Technology, Jan. 15, 2019 (Year: 2019).*

(Continued)

*Primary Examiner* — Seyed Masoud Malekzadeh
*Assistant Examiner* — Xinwen Ye
(74) *Attorney, Agent, or Firm* — Tobias Intellectual Property Law, PLLC

(57) ABSTRACT

Examples of an imaging system for use with a head mounted display (HMD) are disclosed. The imaging system can include a forward-facing imaging camera and a surface of a display of the HMD can include an off-axis diffractive optical element (DOE) or hot mirror configured to reflect light to the imaging camera. The DOE or hot mirror can be segmented, for example, with different segments having different angles or different optical power. The imaging system can be used for eye tracking, biometric identification, multiscopic reconstruction of the three-dimensional shape of (Continued)

the eye, etc. Methods for manufacturing angularly segmented optical elements are also provided. The methods can include injection molding.

19 Claims, 21 Drawing Sheets

(51) Int. Cl.
| | |
|---|---|
| *B29K 33/00* | (2006.01) |
| *B29K 67/00* | (2006.01) |
| *B29K 69/00* | (2006.01) |
| *B29L 11/00* | (2006.01) |
| *G02B 27/00* | (2006.01) |

(52) U.S. Cl.
CPC ...... *G02B 27/0093* (2013.01); *B29K 2033/12* (2013.01); *B29K 2067/003* (2013.01); *B29K 2069/00* (2013.01); *B29K 2995/0026* (2013.01); *B29K 2995/003* (2013.01); *B29L 2011/0058* (2013.01)

(56) References Cited

U.S. PATENT DOCUMENTS

| | | | |
|---|---|---|---|
| 9,676,130 | B2 | 6/2017 | Iatan |
| 10,466,561 | B2 | 11/2019 | Oh |
| 10,502,963 | B1 | 12/2019 | Noble et al. |
| 2006/0028436 | A1 | 2/2006 | Armstrong |
| 2007/0081123 | A1 | 4/2007 | Lewis |
| 2008/0187762 | A1* | 8/2008 | Hayashi .................. H01L 33/60 264/328.18 |
| 2011/0199685 | A1* | 8/2011 | Ito ......................... B32B 33/00 156/242 |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0293217 | A1 | 10/2014 | Ogaya et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0170214 | A1 | 6/2016 | Amitai |
| 2017/0052292 | A1 | 2/2017 | Wilson |
| 2017/0082858 | A1 | 3/2017 | Klug et al. |
| 2018/0164627 | A1 | 6/2018 | Oh |
| 2018/0275409 | A1 | 9/2018 | Gao et al. |
| 2019/0101757 | A1 | 4/2019 | Martinez et al. |
| 2019/0111599 | A1* | 4/2019 | Matsuo ............ B29C 45/14008 |
| 2020/0386989 | A1* | 12/2020 | Hatzilias ............ G02B 27/0093 |
| 2021/0030134 | A1* | 2/2021 | Kim ........................ B32B 15/20 |
| 2022/0274299 | A1 | 9/2022 | Cohen |

FOREIGN PATENT DOCUMENTS

| | | |
|---|---|---|
| JP | 2008241822 A | 10/2008 |
| JP | 2010120206 A | 6/2010 |
| JP | 2011186414 A | 9/2011 |
| JP | 2015194615 A | 11/2015 |
| JP | 2018051974 A | 4/2018 |
| JP | 2018530781 A | 10/2018 |
| WO | 2015198477 A1 | 12/2015 |
| WO | WO 2021/021957 | 2/2021 |

OTHER PUBLICATIONS

EP20846608.6 Extended European Search Report dated Aug. 2, 2023.
International Search Report and Written Opinion for PCT Application No. PCT/US2020/0044107, mailed Nov. 20, 2020.
International Preliminary Report on Patentability for PCT Application No. PCT/US2020/0044107, issued Feb. 1, 2022.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, (Aug. 4, 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
JP2022-506147 Office Action mailed Apr. 12, 2024.
EP20846608.6 Examination Report dated Apr. 9, 2025.

* cited by examiner

ANGULARLY SEGMENTED HOT MIRROR FOR EYE TRACKING

CROSS-REFERENCE TO RELATED APPLICATIONS

This application claims the benefit of priority under 35 U.S.C. § 119(e) to U.S. Provisional Application No. 62/880,499, filed on Jul. 30, 2019, entitled "ANGULARLY SEGMENTED HOT MIRROR FOR EYE TRACKING," which is hereby incorporated by reference herein in its entirety.

BACKGROUND

Field

The present disclosure relates to virtual reality and augmented reality imaging and visualization systems, to imaging systems for acquiring images of an eye, and to methods for manufacturing optical elements for these imaging systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; or a mixed reality "MR," relating to merging real and virtual worlds to produce new environment where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR, and MR technology.

SUMMARY

An embodiment of a head mounted display (HMD) configured to be worn on a head of a user is disclosed. The HMD comprises: a frame comprising a pair of ear stems; a pair of optical elements supported by the frame such that each of the pair of optical elements is capable of being disposed forward of an eye of the user; a forward-facing imager mounted to one of the pair of ear stems; and a reflective element disposed in or on one of the pair of optical elements, the reflective element configured to reflect infrared light toward the forward-facing imager, which is configured to receive the infrared light reflected by the reflective element. Each of the pair of optical elements can be transparent to visible light. The reflective element can include a plurality of segments that have the same or different optical properties. The imager can be configured to acquire imagery of an eye of a wearer of the HMD. The HMD can include a processor that analyzes imagery acquired by the imager for eye tracking, biometric identification, multiscopic reconstruction of a shape of the eye, estimating an accommodation state of the eye, or imaging the retina of the eye. The reflective element can be segmented, with different segments having different angles or different optical powers.

Examples of an imaging system for use with a head mounted display (HMD) are disclosed. The imaging system can include a forward-facing imaging camera and a surface of a display of the HMD can include an off-axis diffractive optical element (DOE) or hot mirror configured to reflect light to the imaging camera. The DOE or hot mirror can be segmented, for example, with different segments having different angles or different optical power. The imaging system can be used for eye tracking, biometric identification, multiscopic reconstruction of the three-dimensional shape of the eye, etc. Methods for manufacturing angularly segmented optical elements are also provided. The methods can include injection molding. A few examples are provided below:

EXAMPLE 1: A method of manufacturing a segmented hot mirror, the method comprising: providing a first mold having a first cavity, the first cavity comprising a first surface having a first portion that is at a non-zero angle relative to a second portion; disposing a hot mirror film adjacent at least the first portion and the second portion of the first surface of the first cavity; injecting a first polymer material into the first cavity of the first mold to form a first molded component; removing the first molded component from the first mold, wherein the first molded component includes at least a portion of the hot mirror film; disposing the first molded component in a second mold having a second cavity; injecting a second polymer material into the second cavity to form a second molded component, the second polymer material covering at least some of the hot mirror film; and removing the second molded component from the second mold.

EXAMPLE 2: The method of example 1, wherein the non-zero angle is in a range from 2 degrees to 25 degrees.

EXAMPLE 3: The method of example 1, wherein the non-zero angle is in a range from 5 degrees to 20 degrees.

EXAMPLE 4: The method of any one of examples 1 to 3, wherein the hot mirror film is substantially transmissive to visible light and substantially reflective of infrared light.

EXAMPLE 5: The method of any one of examples 1 to 4, wherein the hot mirror film is substantially transmissive to light in a first wavelength range from 400 nm to 700 nm and substantially reflective of light in a second wavelength range from about 800 nm to 900 nm.

EXAMPLE 6: The method of any one of examples 1 to 5, wherein the first polymer is the same as the second polymer.

EXAMPLE 7: The method of any one of examples 1 to 6, wherein the first polymer or the second polymer are substantially transmissive to visible light and infrared light.

EXAMPLE 8: The method of any one of examples 1 to 7, wherein the first polymer or the second polymer comprise a thermoplastic polymer.

EXAMPLE 9: The method of any one of examples 1 to 8, wherein the first polymer or the second polymer comprises polycarbonate or polymethyl methacrylate (PMMA).

EXAMPLE 10: The method of any one of examples 1 to 9, further comprising removing a portion of the hot film that extends outside of the first molded component or the second molded component.

EXAMPLE 11: The method of any one of examples 1 to 10, wherein disposing the first molded component in a second mold having a second cavity comprises orienting the first molded component so that the hot mirror film is disposed toward a central region of the second cavity.

EXAMPLE 12: The method of any one of examples 1 to 11, wherein the first mold comprises a vent between the first portion and the second portion.

EXAMPLE 13: The method of any one of examples 1 to 12, further comprising disposing at least one infrared light source in the second cavity of the second mold.

EXAMPLE 14: The method of example 13, wherein the at least one infrared light source is disposed on a polymer film, the method comprising disposing the polymer film in the second cavity of the second mold.

EXAMPLE 15: The method of example 14, wherein the polymer film comprises polyethylene terephthalate (PET).

EXAMPLE 16: The method of any one of examples 1 to 15, wherein the first surface of the first mold comprises a third portion adjacent the second portion, the third portion at a second non-zero angle relative to the second portion.

EXAMPLE 17: The method of any one of examples 1 to 16, wherein the first portion or the second portion of the first surface comprise a curved region.

EXAMPLE 18: The method of any one of examples 1 to 17, further comprising attaching the second molded component to a display for an augmented, mixed, or virtual reality device.

EXAMPLE 19: A method of forming an optical element, the method comprising: disposing an optical film adjacent a segmented surface of a first mold, the segmented surface comprising a first portion and a second portion that is at a non-zero angle to the first portion, the optical film substantially transparent in a first wavelength range and substantially reflective in a second wavelength range different from the first wavelength range; injecting a first polymer into the first cavity of the first mold to form a first optical element, the first polymer substantially transparent in the first wavelength range and the second wavelength range, the first optical element comprising at least a portion of the optical film; disposing the first optical element in a second mold; injecting a second polymer into the second mold to form a second optical element, wherein the second polymer covers at least some of the optical film of the first optical element; and removing the second optical element from the second mold.

EXAMPLE 20: The method of example 19, wherein the first wavelength range comprises at least a portion of the visible wavelength range and the second wavelength range comprises at least a portion of the infrared wavelength range.

EXAMPLE 21: The method of example 19 or example 20, wherein the first mold comprises a vent between the first portion and the second portion.

EXAMPLE 22: The method of any one of examples 19 to 21, wherein the first portion or the second portion of the segmented surface is substantially flat.

EXAMPLE 23: The method of any one of examples 19 to 22, further comprising terminating the optical film at a first edge of the first optical element or a second edge of the second optical element.

EXAMPLE 24: The method of any one of examples 19 to 23, further comprising disposing a light source in the second mold.

EXAMPLE 25: The method of any one of examples 19 to 24, wherein the non-zero angle is in a range from 2 degrees to 25 degrees.

EXAMPLE 26: The method of any one of examples 19 to 25, wherein the optical film comprises a diffractive element or a holographic element.

EXAMPLE 27: A method for forming an optical element, the method comprising: applying an optical film to a first surface of a first optical element, the first surface comprising a first section and a second section, the second section at a non-zero angle relative to the first section; and applying a second optical element to the first optical element to form the optical element, such that the optical film is disposed between the first optical element and the second optical element.

EXAMPLE 28: The method of example 27, wherein the first optical element, the second optical element, and the optical film are optically transmissive in the visible.

EXAMPLE 29: The method of example 28, wherein the optical film is optically reflective in the infrared and the first optical element and the second optical element are optically transmissive in the infrared.

EXAMPLE 30: The method of any one of examples 27 to 29, wherein applying the optical film comprises adhering the optical film on the first surface.

EXAMPLE 31: The method of any one of examples 27 to 29, wherein applying the optical film comprises depositing the optical film on the first surface.

EXAMPLE 32: The method of any one of examples 27 to 31, further comprising injection molding the first optical element.

EXAMPLE 33: The method of any one of examples 27 to 32, wherein applying the second optical element comprises injection molding.

EXAMPLE 34: A segmented hot mirror formed according to any one of the methods of examples 1 to 33.

EXAMPLE 35: An optical element formed according to any one of the methods of examples 1 to 34.

EXAMPLE 36: A display comprising the segmented hot mirror of example 34 or the optical element of example 35.

EXAMPLE 37: An augmented, virtual, or mixed reality display device comprising the display of example 36.

EXAMPLE 38: A method of manufacturing a hot mirror configured for coupling with a display element, the method comprising: disposing a hot mirror layer along first and second surfaces of a first mold, the first surface forming a rise angle with a plane of the second surface, wherein the first and second surfaces of the first mold interface with a first surface of the layer of reflective material, wherein the hot mirror layer is configured to transmit visible light therethrough and to reflect infrared light; forming an intermediate structure by injecting a first transparent material into an interior of the mold to interface with the first surface of the layer of reflective material; and forming an optical element by injecting a second transparent material into an interior of a second mold to interface with a second surface of the layer of reflective material, the second mold housing the intermediate structure, wherein the first surface of the layer of reflective material is opposite the second surface of the layer of reflective material.

EXAMPLE 39: The method of example 38, further comprising coupling the optical element to a display element configured for insertion into a frame configured to be worn by a user.

EXAMPLE 40: The method of any one of examples 38 to 39, wherein the first mold has a shape different from a shape of the second mold.

EXAMPLE 41: The method of any one of examples 38 to 40, wherein the first mold has a shape different from a shape of the second mold.

EXAMPLE 42: The method of any one of examples 38 to 41, wherein the first and second transparent materials are the same.

EXAMPLE 43: The method of any one of examples 38 to 42, wherein at least one of the first and second transparent materials comprises glass or plastic.

EXAMPLE 44: The method of any one of examples 38 to 43, wherein the rise angle is between about 3° and 35°.

EXAMPLE 45: The method of any one of examples 38 to 44, wherein an exterior surface of the intermediate structure comprises the second surface of the layer of reflective material.

EXAMPLE 46: The method of any one of examples 38 to 45, wherein injecting a second transparent material into an interior of a second mold comprises forming a layer of the second transparent material on the second surface of the reflective material.

EXAMPLE 47: The method of any one of examples 38 to 46, further comprising inserting the optical element into a frame configured to be worn on a head of a user.

EXAMPLE 48: The method of example 47, further comprising attaching a camera to the frame, the camera configured to image an eye of the user.

EXAMPLE 49: A hot mirror manufactured according to the method of any one of examples 38 to 48.

EXAMPLE 50: A head mounted display system comprising: a frame configured to be supported on a head of the user; an optical element configured to display an image to a user, the optical element configured to transmit light from the environment to the user's eye to provide a view of a portion of the environment to the user; a forward-facing imager configured to receive light from the optical element; and a reflective element disposed at least partially in the optical element, the reflective element comprising first and second segments, the first segment angled at a non-zero angle relative to the second segment, the first segment configured to produce a first image of the eye configured to be captured by the forward-facing imager and the second segment configured to produce a second image of the eye configured to be captured by the forward-facing imager.

EXAMPLE 51: The head mounted display system of example 50, wherein the reflective element comprises a hot mirror, an off-axis diffractive optical element (DOE), an off-axis holographic mirror (OAHM), or an off-axis volumetric diffractive optical element (OAVDOE).

EXAMPLE 52: The head mounted display system of any of examples 50-51, wherein the first segment has a different optical power than the second segment.

EXAMPLE 53: The head mounted display system of any of examples 50-52, wherein the non-zero angle is in a range from 2 degrees to 25 degrees.

EXAMPLE 54: The head mounted display system of any of examples 50-53, wherein the reflective element comprises a hot mirror film that is substantially transmissive to visible light and substantially reflective of infrared light.

EXAMPLE 55: The head mounted display system of example 54, wherein the hot mirror film is substantially transmissive to light in a first wavelength range from 400 nm to 700 nm and substantially reflective of light in a second wavelength range from about 800 nm to 900 nm.

EXAMPLE 56: The head mounted display system of any of examples 50-55, wherein the optical element comprises at least one infrared light source disposed on or at least partially therein.

EXAMPLE 57: The head mounted display system of any of examples 50-56, wherein the optical element comprises polyethylene terephthalate (PET).

EXAMPLE 58: The head mounted display system of any of examples 50-57, further comprising: non-transitory memory configured to store images of the eye of the user obtained by the forward-facing imager; and a hardware processor in communication with the non-transitory memory, the hardware processor programmed to: access the images of the eye; and perform one or more of the following: track the eye of the user; extract biometric information associated with the eye of the user; reconstruct a shape of a portion of the eye of the user; estimate an accommodation state of the eye of the user; or image a retina, an iris, or other element of the eye of the user.

EXAMPLE 59: The head mounted display system of example 58, wherein the hardware processor is programmed to utilize the shape of the portion of the eye of the user to estimate orientation of the eye.

EXAMPLE 60: The head mounted display system of any of examples 50-59, wherein the optical element is positioned forward a first eye of the user.

EXAMPLE 61: The head mounted display system of any of examples 50-60, wherein the frame supports a second reflective element having a plurality of reflective segments, the second optical element positioned forward a second eye of the user.

EXAMPLE 62: The head mounted display system of any of examples 50-61, wherein at least one of the first or second segments is configured to generate a respective virtual camera imaging the eye at infinity.

EXAMPLE 63: The head mounted display system of example 62, wherein to image the eye, the imager uses the first segment when the user is looking upward and the second segment when the user is looking downward.

EXAMPLE 64: The head mounted display system of any of examples 62-63, wherein to image the eye the display system selects a segment of the first or second segments that has the lesser occlusion by eyelashes or eyelids of the user.

EXAMPLE 65: A head mounted display system comprising: a frame configured to be supported on a head of the user; a display disposed on the frame; an eyepiece configured to receive light from said display and to project light into said user's eye to display virtual image content to the user's vision field, said eyepiece including a transparent portion disposed to transmits light from a portion of the environment in front of the user and said head-mounted display to the user's eye to provide a view of said portion of the environment in front of the user and said head-mounted display, said eyepiece comprising at least one layer; and at least one light source at least partially embedded in said at least one layer to direct light to the user's eye.

EXAMPLE 66: The head mounted display system of example 65, further comprising an imager configured to image the user's eye.

EXAMPLE 67: The head mounted display system of example 65, further comprising a forward-facing imager configured to image the user's eye.

EXAMPLE 68: The head mounted display system of example 67, a reflective element comprising first and second segments, the first segment angled at a non-zero angle relative to the second segment, the first segment configured to produce a first image of the eye to be captured by the forward-facing imager and the second segment configured to produce a second image of the eye to be captured by the forward-facing imager.

EXAMPLE 69: The head mounted display system of example 68, wherein the reflective element comprises a hot mirror, an off-axis diffractive optical element (DOE), an off-axis holographic mirror (OAHM), or an off-axis volumetric diffractive optical element (OAVDOE).

EXAMPLE 70: The optical eyepiece of any of examples 68-69, wherein the first segment has a different optical power than the second segment.

EXAMPLE 71: The head mounted display system of any of examples 68-70, wherein the non-zero angle is in a range from 2 degrees to 25 degrees.

EXAMPLE 72: The head mounted display system of any of examples 68-71, wherein the reflective element comprises a hot mirror film that is substantially transmissive to visible light and substantially reflective of infrared light.

EXAMPLE 73: The head mounted display system of example 72, wherein the hot mirror film is substantially transmissive to light in a first wavelength range from 400 nm to 700 nm and substantially reflective of light in a second wavelength range from about 800 nm to 900 nm.

EXAMPLE 74: The head mounted display system of any of examples 65-73, wherein said eyepiece comprises at least one waveguide.

EXAMPLE 75: The head mounted display system of any of examples 65-74, wherein said eyepiece comprises a stack of layers.

EXAMPLE 76: The head mounted display system of example 75, wherein the stack of layers comprises at least one waveguide.

EXAMPLE 77: The head mounted display system of example 75, wherein the stack of layers comprises a plurality of waveguides.

EXAMPLE 78: The head mounted display system of any of examples 75-77, wherein a reflective element comprising first and second segments is included in said stack of layers, the first segment angled at a non-zero angle relative to the second segment, the first segment configured to produce a first image of the eye to be captured by the forward-facing imager and the second segment configured to produce a second image of the eye configured to be captured by the forward-facing imager.

EXAMPLE 79: The head mounted display system of example 78, wherein the reflective element comprises a hot mirror, an off-axis diffractive optical element (DOE), an off-axis holographic mirror (OAHM), or an off-axis volumetric diffractive optical element (OAVDOE).

EXAMPLE 80: The head mounted display system of any of examples 65-79, wherein said at least one light source comprises an infrared light source.

EXAMPLE 81: The head mounted display system of any of examples 65-80, wherein said at least one light source is configured to form a glint on the user's eye.

EXAMPLE 82: The head mounted display system of any of claims 65-81, wherein said at least one light source comprises a solid-state emitter.

EXAMPLE 83: The head mounted display system of any of examples 65-82, wherein said at least one light source at least partially embedded in said at least one layer comprises at least one LED.

EXAMPLE 84: The head mounted display system of any of examples 65-83, further comprising conductive material to provide electrical power to said at least one light source, said conductive material being transmissive to visible light.

EXAMPLE 85: The head mounted display system of examples 84, wherein said conductive material comprises indium tin oxide.

EXAMPLE 86: The head mounted display system of any of examples 65-85, wherein said at least one layer comprises a transparent layer.

EXAMPLE 87: The head mounted display system of any of examples 65-86, wherein said at least one layer comprises polymer.

EXAMPLE 88: A method of forming an optical element, the method comprising: applying an optical film to a first surface of a first transparent body, the first surface comprising a first section and a second section, the second section at a non-zero angle relative to the first section; applying a second transparent body to the first transparent body such that the optical film is disposed between the first transparent body and the second transparent body; and disposing a layer comprising at least one light source on at least one of the first or second transparent bodies.

EXAMPLE 89: The method of example 88, wherein the optical film is optically transmissive in the visible.

EXAMPLE 90: The method of example 89, wherein the optical film is optically reflective in the infrared and the first optical element and the second optical element are optically transmissive in the infrared.

EXAMPLE 91: The method of any one of examples 88 to 90, wherein applying the optical film comprises adhering the optical film on the first surface.

EXAMPLE 92: The method of any one of examples 88 to 91, wherein applying the optical film comprises depositing the optical film on the first surface.

EXAMPLE 93: The method of any one of examples 88 to 92, further comprising injection molding the first transparent body.

EXAMPLE 94: The method of any one of examples 88 to 93, wherein applying the second optical element comprises injection molding.

EXAMPLE 95: The method of any of examples 88 to 94, wherein said layer comprising the at least one light source is disposed on said first transparent body.

EXAMPLE 96: The method of any of examples 88 to 95, wherein said layer comprising the at least one light source is disposed on said second transparent body.

EXAMPLE 97: The method of any one of examples 88 to 96, further comprising disposing the at least one light source within the first transparent body.

EXAMPLE 98: The method of any one of examples 88 to 97, further comprising disposing the at least one light source within the second transparent body.

EXAMPLE 99: The method of any of examples 88 to 98, further comprising at least partially embedding said at least one light source in said first transparent body.

EXAMPLE 100: The method of any of examples 88 to 99, further comprising at least partially embedding said at least one light source in said second transparent body.

EXAMPLE 101: The method of any of examples 88-100, wherein said layer comprising said at least one light source comprises a transparent layer.

EXAMPLE 102: The method of any of examples 88-101, wherein said at least one light source comprises a solid-state emitter.

EXAMPLE 103: The method of any of examples 88-102, wherein said at least one light source comprises an LED.

EXAMPLE 104: A segmented hot mirror formed according to any one of the methods of examples 88 to 103.

EXAMPLE 105: An optical element formed according to any one of the methods of examples 88 to 103.

EXAMPLE 106: A display comprising the segmented hot mirror of example 104 or the optical element of example 105.

EXAMPLE 107: An augmented, virtual, or mixed reality display device comprising the display of example 106.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
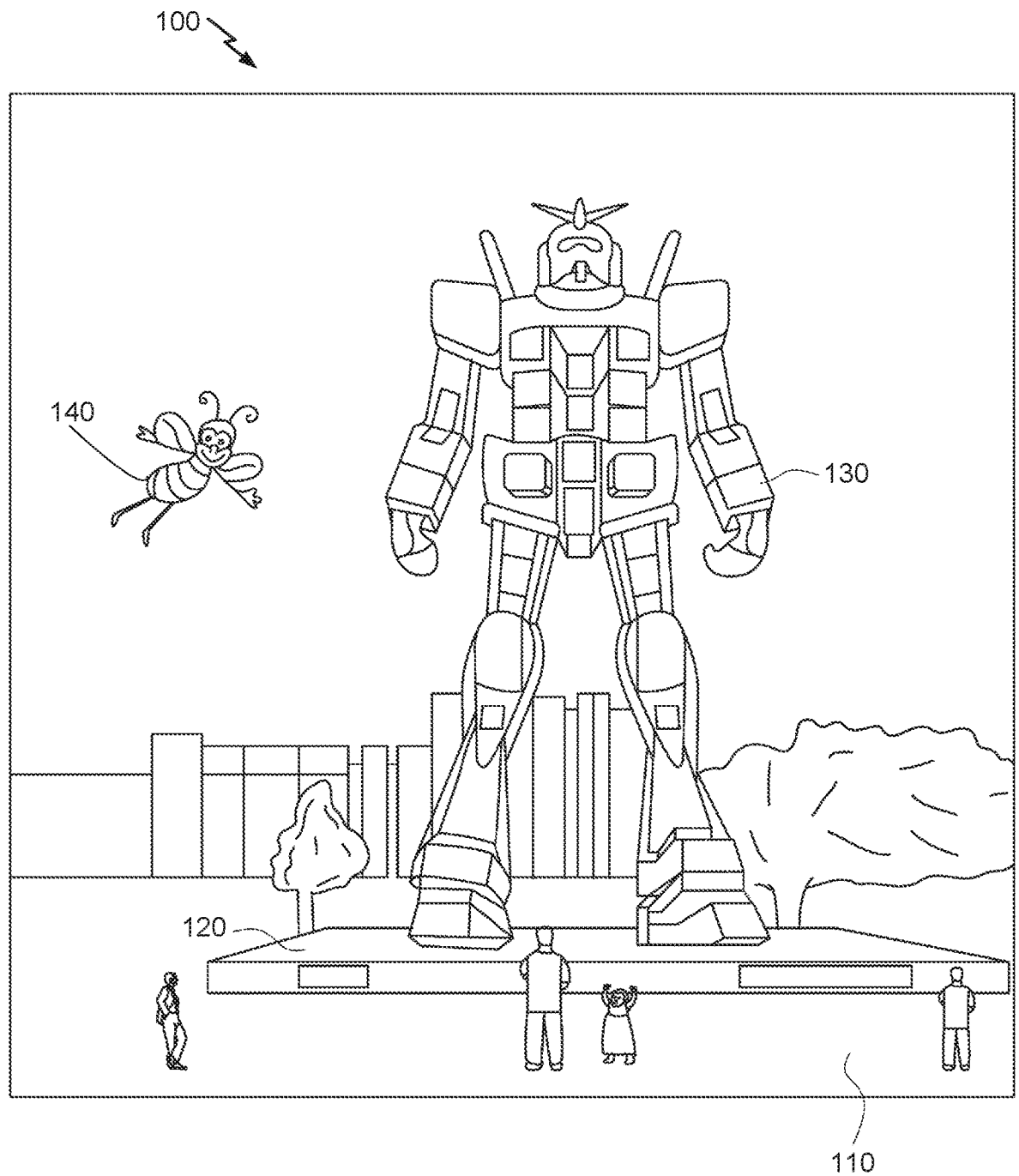
FIG. 1 depicts an illustration of an augmented reality scenario with certain virtual reality objects, and certain actual reality objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

The eyes of a wearer of a head mounted display (HMD) can be imaged using a reflective off-axis Diffractive Optical Element (DOE). In some implementations, the DOE may be a Holographic Optical Element (HOE), an off-axis holographic mirror (OAHM), or an off-axis volumetric diffractive optical element (OAVDOE). The eyes of the wearer can additionally or alternatively be imaged using a hot mirror (e.g., which is transmissive to visible and reflective in infrared). The resulting images can be used to track an eye or eyes, image the retina, reconstruct the eye shape in three dimensions, extract biometric information from the eye (e.g., iris identification), etc.

A head mounted display (HMD) might use information about the state of the eyes of the wearer for a variety of purposes. For example, this information can be used for estimating the gaze direction of the wearer or for biometric identification. However, imaging the eyes of a wearer of a HMD can be challenging. The distance between the HMD and the wearer's eyes is short. Furthermore, gaze tracking requires a larger field of view, while biometric identification requires a relatively high number of pixels on target on the iris. For an imaging system which will attempt to accomplish both of these objectives, the requirements of the two tasks are largely at odds. Furthermore, both problems may be further complicated by occlusion by the eyelids and eyelashes.

Embodiments of the imaging systems described herein address some or all of these problems. For example, an imaging system can comprise an imager which is configured to view an eye of a wearer. The imaging system can be mounted in proximity to the wearer's temple (e.g., on a frame of a wearable display system, for example, an ear stem). In some embodiments, a second imager can be used for the wearer's other eye so that each eye is separately imaged. The imager can include an infrared digital camera that is sensitive to infrared radiation. The imager can be mounted so that it is facing forward (in the direction of the wearer's vision), rather than facing backward and directed at the eye. By disposing the imager nearer the ear of the wearer, the weight of the imager may also be nearer the ear, and the HMD may be easier to wear as compared to an HMD where the imager is backward facing and disposed nearer to the front of the HMD. Additionally, by placing the forward-facing imager near the wearer's temple, the distance from the wearer's eye to the imager is roughly twice as large as compared to a backward-facing imager disposed near the front of the HMD. Since the depth of field of an image is roughly proportional to this distance, the depth of field for the forward-facing imager is roughly twice as large as compared to a backward-facing imager. A larger depth of field for the imager can be advantageous for imaging the eye region of wearers having large or protruding noses, brow ridges, etc.

The imager can be positioned to view an inside surface of an otherwise transparent optical element. The optical element can be a portion of a display of an HMD (or a lens in a pair of eyeglasses). The optical element can comprise a surface reflecting a first range of wavelengths while being substantially transmissive to a second range of wavelengths (that is different from the first range of wavelengths). The first range of wavelengths can be in the infrared, and the second range of wavelengths can be in the visible. For example, the optical element can comprise a hot mirror, which reflects infrared light while transmitting visible light. Visible light from the outside world can be transmitted through the optical element and can be perceived by the wearer. In effect, the imaging system acts as if there were a virtual imager directed back toward the wearer's eye. The virtual imager can image virtual infrared light propagated from the wearer's eye through the optical element. The hot mirror (or other DOE described herein) can be disposed on the inside surface of the optical element, on an outside surface of the optical element, or within the optical element (e.g., a volume HOE).

In some embodiments, the optical element comprises multiple segments with different optical properties, for example, angle or optical power. The different segments of the optical element advantageously can reflect light to the imager when the wearer looks in different directions.

Examples of manufacturing processes for manufacturing a segmented optical element are provided. The manufacturing process can include injection molding. An injection mold can include a segmented surface with different segments having different angles (or optical powers).

Infrared radiation can include radiation with wavelengths in a range from 700 nm to 10 µm. Infrared radiation can include near-infrared radiation with wavelengths in a range from 700 nm to 1.5 µm. In many implementations, the eye imaging is performed in the near infrared at wavelengths from 700 nm to 900 nm.

3D Display

FIG. 1 depicts an illustration of an augmented reality scenario with certain virtual reality objects, and certain actual reality objects viewed by a person. FIG. 1 depicts an augmented reality scene 100, wherein a user of an AR technology sees a real-world park-like setting 110 featuring people, trees, buildings in the background, and a concrete platform 120. In addition to these items, the user of the AR technology also perceives that he "sees" a robot statue 130 standing upon the real-world platform 120, and a cartoon-like avatar character 140 flying by which seems to be a personification of a bumble bee, even though these elements do not exist in the real world.

In order for a three-dimensional (3-D) display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth.

Figure 2:
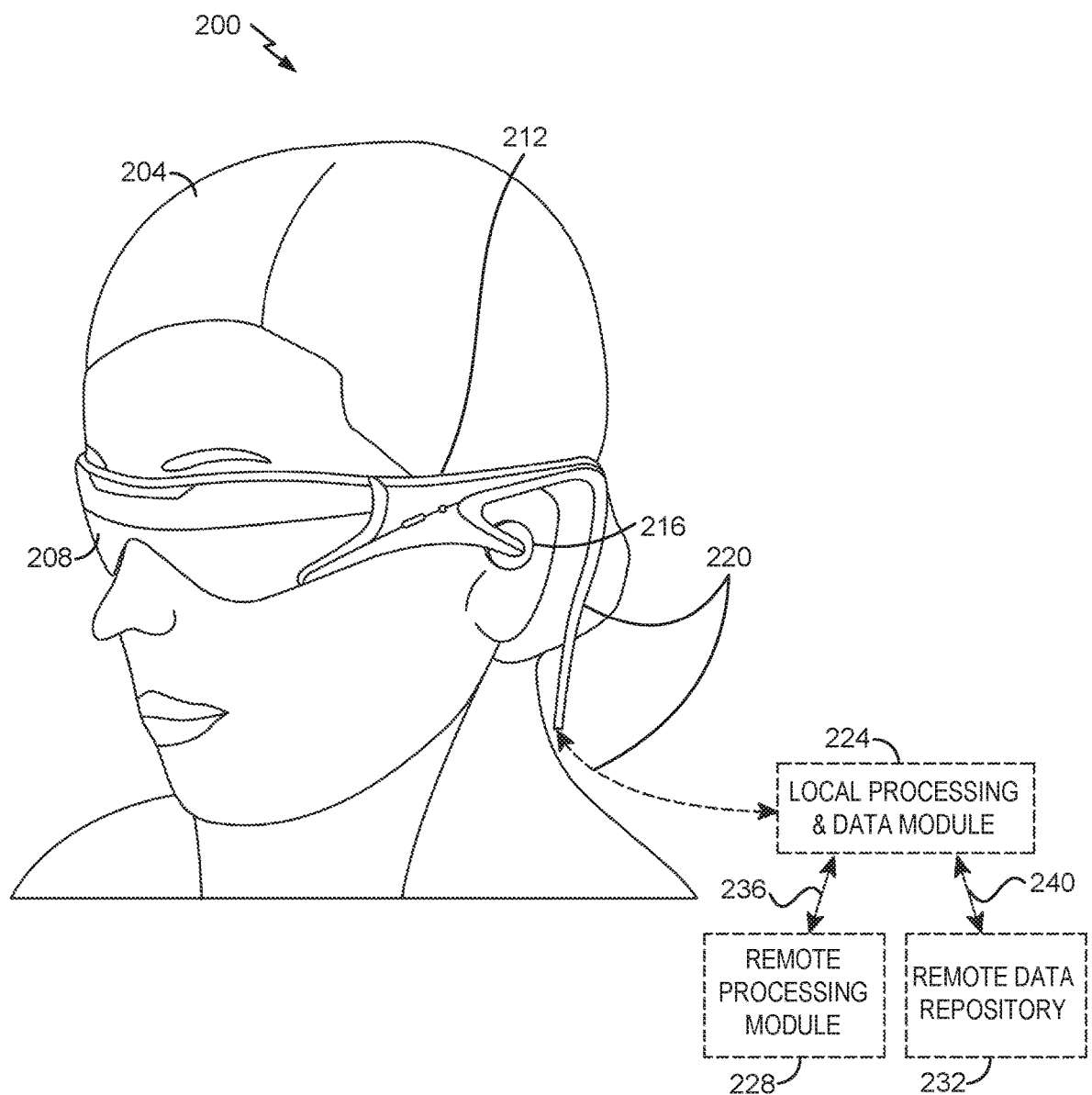
FIG. 2 schematically illustrates an example of a wearable display system.

FIG. 2 illustrates an example of wearable display system 200 that can be used to present a VR, AR, or MR experience to a display system wearer or viewer 204. The display system 200 includes a display 208, and various mechanical and electronic modules and systems to support the functioning of display 208. The display 208 may be coupled to a frame 212, which is wearable by a display system user, wearer, or viewer 204 and which is configured to position the display 208 in front of the eyes of the wearer 204. The display 208 may be a light field display. In some embodiments, a speaker 216 is coupled to the frame 212 and positioned adjacent the ear canal of the user (in some embodiments, another speaker, not shown, is positioned adjacent the other ear canal of the user to provide for stereo/shapeable sound control). The display 208 is operatively coupled 220, such as by a wired lead or wireless connectivity, to a local data processing module 224 which may be mounted in a variety of configurations, such as fixedly attached to the frame 212, fixedly attached to a helmet or hat worn by the user, embedded in headphones, or otherwise removably attached to the user 204 (e.g., in a backpack-style configuration, in a belt-coupling style configuration).

The local processing and data module 224 may comprise a hardware processor, as well as non-transitory digital memory, such as non-volatile memory (e.g., flash memory), both of which may be utilized to assist in the processing, caching, and storage of data. The data may include data (a) captured from sensors (which may be, e.g., operatively coupled to the frame 212 or otherwise attached to the user 204), such as image capture devices (such as cameras), microphones, inertial measurement units, accelerometers, compasses, GPS units, radio devices, and/or gyros; and/or (b) acquired and/or processed using remote processing module 228 and/or remote data repository 232, possibly for passage to the display 208 after such processing or retrieval. The local processing and data module 224 may be operatively coupled to the remote processing module 228 and remote data repository 232 by communication links 236 and/or 240, such as via wired or wireless communication links, such that these remote modules 228, 232 are available as resources to the local processing and data module 224. In addition, remote processing module 228 and remote data repository 232 may be operatively coupled to each other.

In some embodiments, the remote processing module 228 may comprise one or more processors configured to analyze and process data and/or image information such as video information captured by an image capture device. The video data may be stored locally in the local processing and data module 224 and/or in the remote data repository 232. In some embodiments, the remote data repository 232 may comprise a digital data storage facility, which may be available through the internet or other networking configuration in a "cloud" resource configuration. In some embodiments, all data is stored and all computations are performed in the local processing and data module 224, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic or comfortable simulations of three-dimensional imagery.

Figure 3:
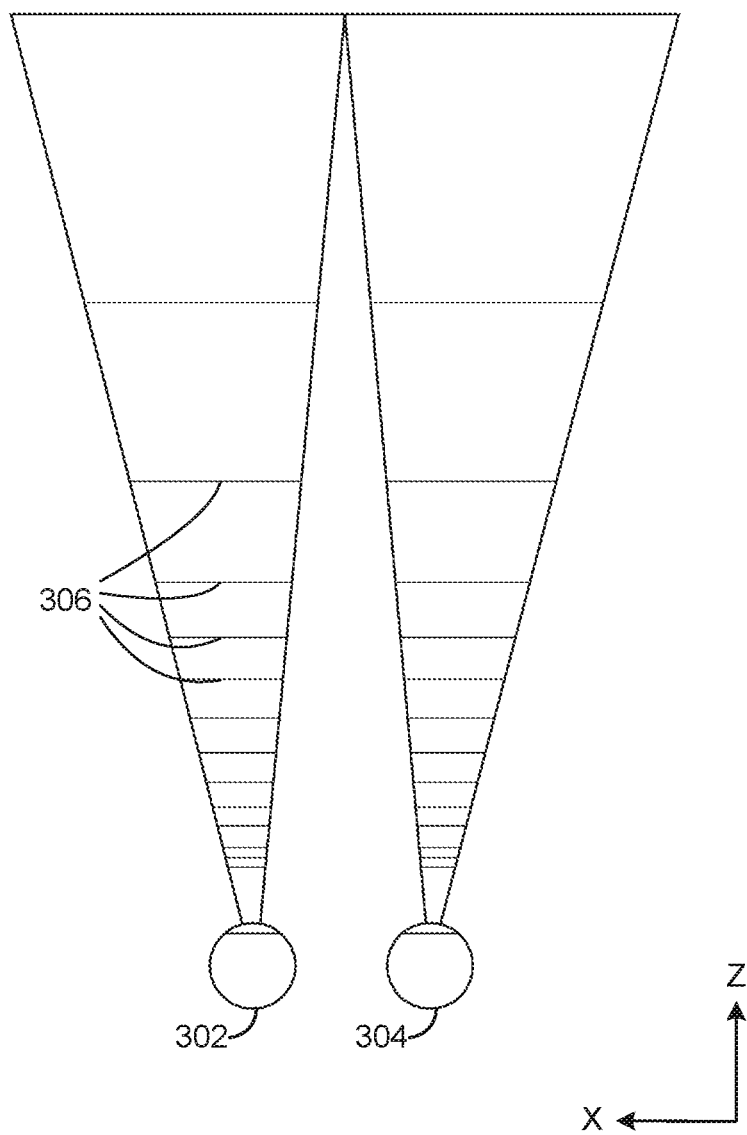
FIG. 3 schematically illustrates aspects of an approach for simulating three-dimensional imagery using multiple depth planes.

FIG. 3 illustrates aspects of an approach for simulating three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
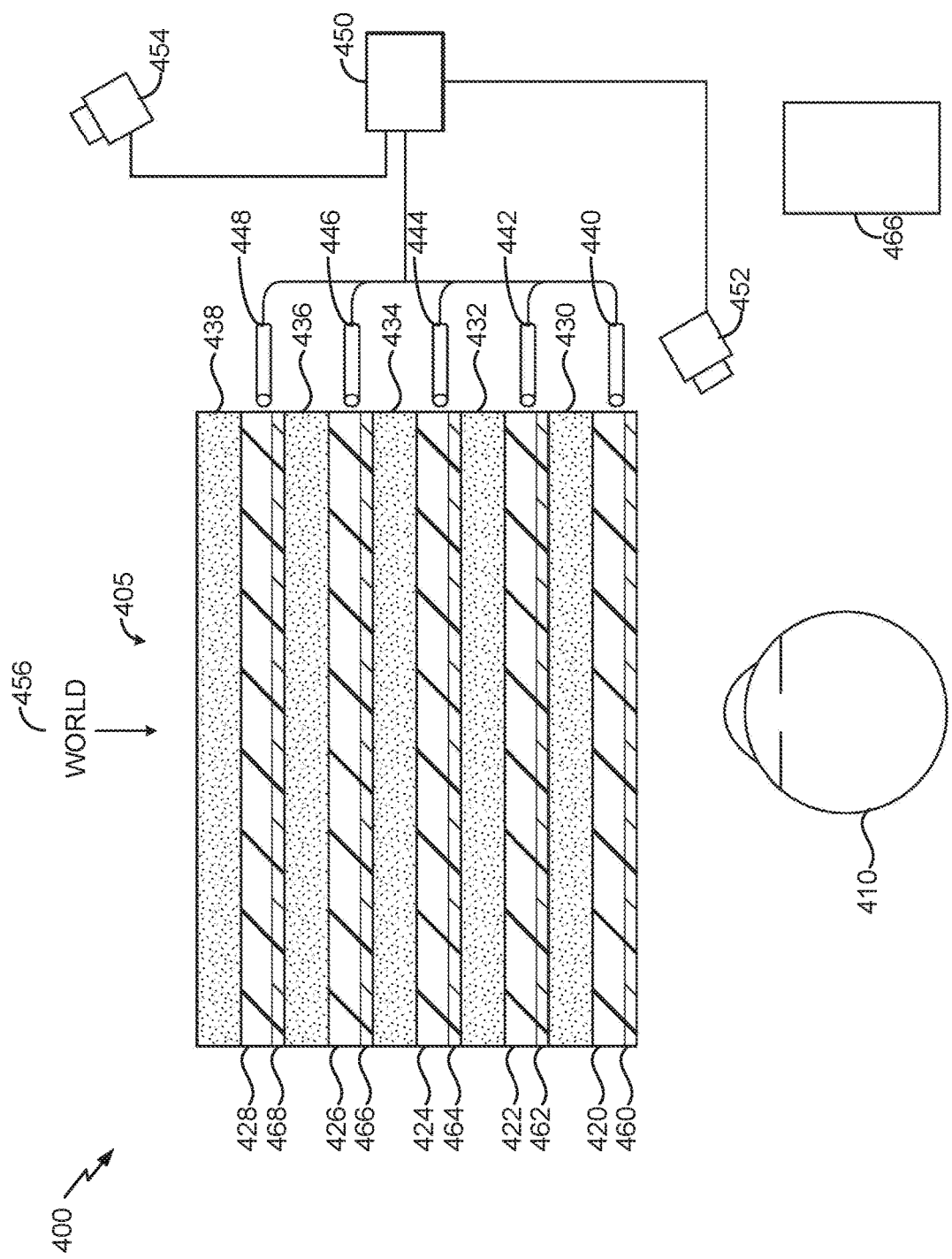
FIG. 4 schematically illustrates an example of a waveguide stack for outputting image information to a user.

FIG. 4 illustrates an example of a waveguide stack for outputting image information to a user. A display system 400 includes a stack of waveguides, or stacked waveguide assembly 405 that may be utilized to provide three-dimensional perception to the eye 410 or brain using a plurality of waveguides 420, 422, 424, 426, 428. In some embodiments, the display system 400 may correspond to system 200 of FIG. 2, with FIG. 4 schematically showing some parts of that system 200 in greater detail. For example, in some embodiments, the waveguide assembly 405 may be integrated into the display 208 of FIG. 2.

With continued reference to FIG. 4, the waveguide assembly 405 may also include a plurality of features 430, 432, 434, 436 between the waveguides. In some embodiments, the features 430, 432, 434, 436 may be lenses. In some embodiments, the features 430, 432, 434, 436 may not be lenses. Rather, they may be spacers (e.g., cladding layers and/or structures for forming air gaps).

The waveguides 420, 422, 424, 426, 428 and/or the plurality of lenses 430, 432, 434, 436 may be configured to send image information to the eye with various levels of wavefront curvature or light ray divergence. Each waveguide level may be associated with a particular depth plane and may be configured to output image information corresponding to that depth plane. Image injection devices 440, 442, 444, 446, 448 may be utilized to inject image information into the waveguides 420, 422, 424, 426, 428, each of which may be configured to distribute incoming light across each respective waveguide, for output toward the eye 410. Light exits an output surface of the image injection devices 440, 442, 444, 446, 448 and is injected into a corresponding input edge of the waveguides 420, 422, 424, 426, 428. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 440, 442, 444, 446, 442 are discrete displays that each produce image information for injection into a corresponding waveguide 420, 422, 424, 426, 428, respectively. In some other embodiments, the image injection devices 440, 442, 446, 446, 448 are the output ends of a single multiplexed display which may, for example, pipe image information via one or more optical conduits (such as fiber optic cables) to each of the image injection devices 440, 442, 444, 446, 448.

A controller 450 controls the operation of the stacked waveguide assembly 405 and the image injection devices 440, 442, 444, 446, 448. In some embodiments, the controller 450 includes programming (e.g., instructions in a non-transitory computer-readable medium) that regulates the timing and provision of image information to the waveguides 420, 422, 424, 426, 428. In some embodiments, the controller 450 may be a single integral device, or a distributed system connected by wired or wireless communication channels. The controller 450 may be part of the processing modules 224 or 228 (illustrated in FIG. 2) in some embodiments. In some embodiments, the controller may be in communication with an inward-facing imaging system 452 (e.g., a digital camera), an outward-facing imaging system 454 (e.g., a digital camera), and/or a user input device 466. The inward-facing imaging system 452 (e.g., a digital camera) can be used to capture images of the eye 410 to, for example, determine the size and/or orientation of the pupil of the eye 410. The outward-facing imaging system 454 can be used to image a portion of the world 456. The user can input commands to the controller 450 via the user input device 466 to interact with the display system 400.

The waveguides 420, 422, 424, 426, 428 may be configured to propagate light within each respective waveguide by total internal reflection (TIR). The waveguides 420, 422, 424, 426, 428 may each be planar or have another shape (e.g., curved), with major top and bottom surfaces and edges extending between those major top and bottom surfaces. In the illustrated configuration, the waveguides 420, 422, 424, 426, 428 may each include light extracting optical elements 460, 462, 464, 466, 468 that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (460, 462, 464, 466, 468 may, for example, be reflective and/or diffractive optical features. While illustrated disposed at the bottom major surfaces of the waveguides 420, 422, 424, 426, 428 for ease of description and drawing clarity, in some embodiments, the light extracting optical elements 460, 462, 464, 466, 468 may be disposed at the top and/or bottom major surfaces, and/or may be disposed directly in the volume of the waveguides 420, 422, 424, 426, 428. In some embodiments, the light extracting optical elements 460, 462, 464, 466, 468 may be formed in a layer of material that is attached to a transparent substrate to form the waveguides 420, 422, 424, 426, 428. In some other embodiments, the waveguides 420, 422, 424, 426, 428 may be a monolithic piece of material and the light extracting optical elements 460, 462, 464, 466, 468 may be formed on a surface and/or in the interior of that piece of material.

With continued reference to FIG. 4, as discussed herein, each waveguide 420, 422, 424, 426, 428 is configured to output light to form an image corresponding to a particular depth plane. For example, the waveguide 420 nearest the eye may be configured to deliver collimated light, as injected into such waveguide 420, to the eye 410. The collimated light may be representative of the optical infinity focal plane. The next waveguide up 422 may be configured to send out collimated light which passes through the first lens 430 (e.g., a negative lens) before it can reach the eye 410. First lens 430 may be configured to create a slight convex wavefront curvature so that the eye/brain interprets light coming from that next waveguide up 422 as coming from a first focal plane closer inward toward the eye 410 from optical infinity. Similarly, the third up waveguide 424 passes its output light through both the first lens 430 and second lens 432 before reaching the eye 410. The combined optical power of the first and second lenses 430 and 432 may be configured to create another incremental amount of wavefront curvature so that the eye/brain interprets light coming from the third waveguide 424 as coming from a second focal plane that is even closer inward toward the person from optical infinity than was light from the next waveguide up 422.

The other waveguide layers (e.g., waveguides 426, 428) and lenses (e.g., lenses 434, 436) are similarly configured, with the highest waveguide 428 in the stack sending its output through all of the lenses between it and the eye for an aggregate focal power representative of the closest focal plane to the person. To compensate for the stack of lenses 430, 432, 434, 436 when viewing/interpreting light coming from the world 456 on the other side of the stacked waveguide assembly 405, a compensating lens layer 438 may be disposed at the top of the stack to compensate for the aggregate power of the lens stack 430, 432, 434, 436 below. Such a configuration provides as many perceived focal planes as there are available waveguide/lens pairings. Both the light extracting optical elements 460, 462, 464, 466, 468 of the waveguides 420, 422, 424, 426, 428 and the focusing aspects of the lenses 430, 432, 434, 436 may be static (e.g., not dynamic or electro-active). In some alternative embodiments, either or both may be dynamic using electro-active features.

With continued reference to FIG. 4, the light extracting optical elements 460, 462, 464, 466, 468 may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 460, 462, 464, 466, 468 may be volumetric or surface features, which may be configured to output light at specific angles. For example, the light extracting optical elements 460, 462, 464, 466, 468 may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety. In some embodiments, the features 430, 432, 434, 436 may not be lenses. Rather, they may simply be spacers (e.g., cladding layers and/or structures for forming air gaps).

In some embodiments, the light extracting optical elements 460, 462, 464, 466, 468 are diffractive features that form a diffraction pattern, or "diffractive optical element" (also referred to herein as a "DOE"). Preferably, the DOE's have a relatively low diffraction efficiency so that only a portion of the light of the beam is deflected away toward the eye 410 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 410 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field may be varied dynamically based on the pupil sizes and/or orientations of the eyes of the viewer. In some embodiments, an inward-facing imaging system 452 (e.g., a digital camera) may be used to capture images of the eye 410 to determine the size and/or orientation of the pupil of the eye 410. In some embodiments, the inward-facing imaging system 452 may be attached to the frame 212 (as illustrated in FIG. 2) and may be in electrical communication with the processing modules 224 and/or 228, which may process image information from the inward-facing imaging system 452) to determine, e.g., the pupil diameters and/or orientations of the eyes of the user 204.

In some embodiments, the inward-facing imaging system 452 (e.g., a digital camera) can observe the movements of the user, such as the eye movements and the facial movements. The inward-facing imaging system 452 may be used to capture images of the eye 410 to determine the size and/or orientation of the pupil of the eye 410. The inward-facing imaging system 452 can be used to obtain images for use in determining the direction the user is looking (e.g., eye pose) or for biometric identification of the user (e.g., via iris identification). The images obtained by the inward-facing imaging system 452 may be analyzed to determine the user's eye pose and/or mood, which can be used by the display system 400 to decide which audio or visual content should be presented to the user. The display system 400 may also determine head pose (e.g., head position or head orientation) using sensors such as inertial measurement units (IMUs), accelerometers, gyroscopes, etc. The head's pose may be used alone or in combination with eye pose to interact with stem tracks and/or present audio content.

In some embodiments, one camera may be utilized for each eye, to separately determine the pupil size and/or orientation of each eye, thereby allowing the presentation of image information to each eye to be dynamically tailored to that eye. In some embodiments, at least one camera may be utilized for each eye, to separately determine the pupil size and/or eye pose of each eye independently, thereby allowing the presentation of image information to each eye to be dynamically tailored to that eye. In some other embodiments, the pupil diameter and/or orientation of only a single eye 410 (e.g., using only a single camera per pair of eyes) is determined and assumed to be similar for both eyes of the viewer 204.

For example, depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 450 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The display system 400 can include an outward-facing imaging system 454 (e.g., a digital camera) that images a portion of the world 456. This portion of the world 456 may be referred to as the field of view (FOV) and the imaging system 454 is sometimes referred to as an FOV camera. The entire region available for viewing or imaging by a viewer 204 may be referred to as the field of regard (FOR). The FOR may include 4π steradians of solid angle surrounding the display system 400. In some implementations of the display system 400, the FOR may include substantially all of the solid angle around a user 204 of the display system 400, because the user 204 can move their head and eyes to look at objects surrounding the user (in front, in back, above, below, or on the sides of the user). Images obtained from the outward-facing imaging system 454 can be used to track gestures made by the user (e.g., hand or finger gestures), detect objects in the world 456 in front of the user, and so forth.

The display system 400 can include a user input device 466 by which the user can input commands to the controller 450 to interact with the display system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. In some cases, the user may use a finger (e.g., a thumb) to press or swipe on a touch-sensitive input device to provide input to the display system 400 (e.g., to provide user input to a user interface provided by the display system 400). The user input device 466 may be held by the user's hand during the use of the display system 400. The user input device 466 can be in wired or wireless communication with the display system 400.

Figure 5:
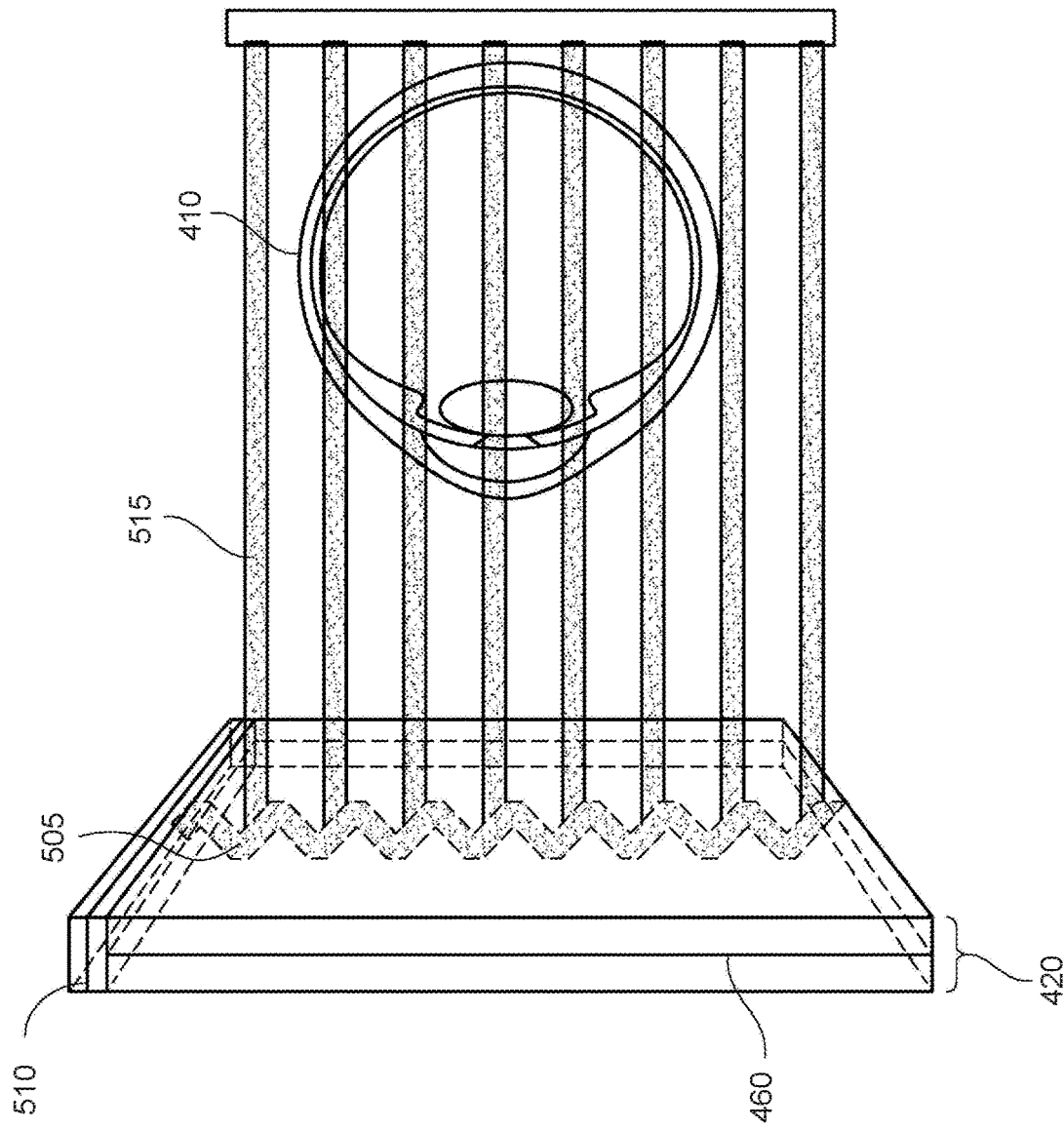
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 405 may function similarly, where the waveguide assembly 405 includes multiple waveguides. Light 505 is injected into the waveguide 420 at the input edge 510 of the waveguide 420 and propagates within the waveguide 420 by TIR. At points where the light 505 impinges on the DOE 460, a portion of the light exits the waveguide as exit beams 515. The exit beams 515 are illustrated as substantially parallel but they may also be redirected to propagate to the eye 410 at an angle (e.g., forming divergent exit beams), depending on the depth plane associated with the waveguide 420. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
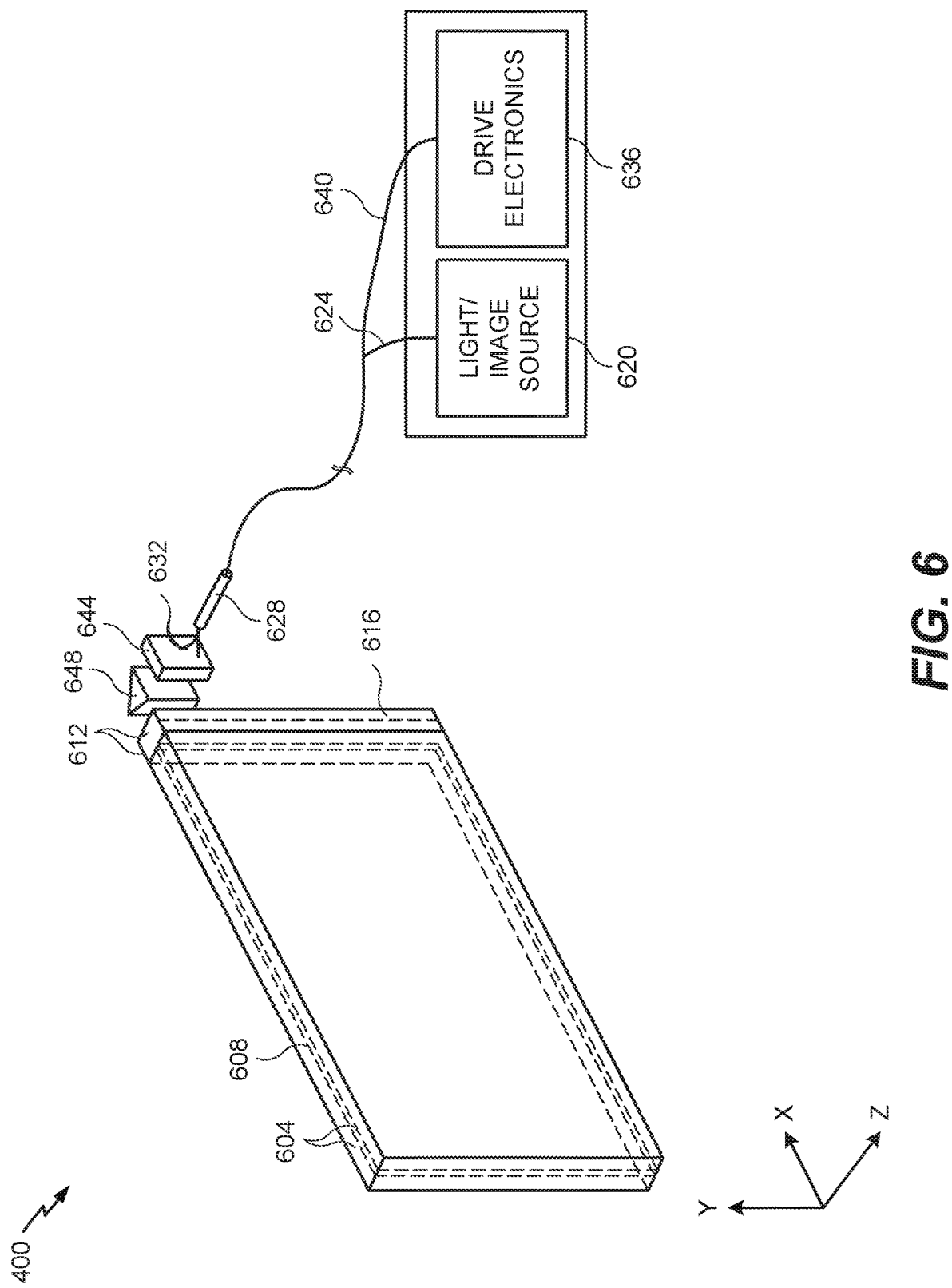
FIG. 6 is a schematic diagram showing a display system including a waveguide apparatus, an optical coupler subsystem to optically couple light to or from the waveguide apparatus, and a control subsystem, used in the generation of a multi-focal volumetric display, image, or light field.

FIG. 6 shows another example of the display system 400 including a waveguide apparatus, an optical coupler subsystem to optically couple light to or from the waveguide apparatus, and a control subsystem. The display system 400 can be used to generate a multi-focal volumetric, image, or light field. The display system 400 can include one or more primary planar waveguides 604 (only one is shown in FIG. 6) and one or more DOEs 608 associated with each of at least some of the primary waveguides 604. The planar waveguides 604 can be similar to the waveguides 420, 422, 424, 426, 428 discussed with reference to FIG. 4. The optical system may employ a distribution waveguide apparatus, to relay light along a first axis (vertical or Y-axis in view of FIG. 6), and expand the light's effective exit pupil along the first axis (e.g., Y-axis). The distribution waveguide apparatus, may, for example include a distribution planar waveguide 612 and at least one DOE 616 (illustrated by double dash-dot line) associated with the distribution planar waveguide 612. The distribution planar waveguide 612 may be similar or identical in at least some respects to the primary planar waveguide 604, having a different orientation therefrom. Likewise, the at least one DOE 616 may be similar or identical in at least some respects to the DOE 608. For example, the distribution planar waveguide 612 and/or DOE 616 may be comprised of the same materials as the primary planar waveguide 604 and/or DOE 608, respectively. The optical system shown in FIG. 6 can be integrated into the wearable display system 200 shown in FIG. 2.

The relayed and exit-pupil expanded light is optically coupled from the distribution waveguide apparatus into the one or more primary planar waveguides 604. The primary planar waveguide 662 relays light along a second axis, preferably orthogonal to first axis, (e.g., horizontal or X-axis in view of FIG. 6). Notably, the second axis can be a non-orthogonal axis to the first axis. The primary planar waveguide 604 expands the light's effective exit path along that second axis (e.g., X-axis). For example, the distribution planar waveguide 612 can relay and expand light along the vertical or Y-axis, and pass that light to the primary planar waveguide 604 which relays and expands light along the horizontal or X-axis.

The display system 400 may include one or more sources of colored light (e.g., red, green, and blue laser light) 620 which may be optically coupled into a proximal end of a single mode optical fiber 624. A distal end of the optical fiber 624 may be threaded or received through a hollow tube 628 of piezoelectric material. The distal end protrudes from the tube 628 as fixed-free flexible cantilever 632. The piezoelectric tube 628 can be associated with four quadrant electrodes (not illustrated). The electrodes may, for example, be plated on the outside, outer surface or outer periphery or diameter of the tube 628. A core electrode (not illustrated) is also located in a core, center, inner periphery or inner diameter of the tube 628.

Drive electronics 636, for example electrically coupled via wires 640, drive opposing pairs of electrodes to bend the piezoelectric tube 628 in two axes independently. The protruding distal tip of the optical fiber 624 has mechanical modes of resonance. The frequencies of resonance can depend upon a diameter, length, and material properties of the optical fiber 624. By vibrating the piezoelectric tube 628 near a first mode of mechanical resonance of the fiber cantilever 632, the fiber cantilever 632 is caused to vibrate, and can sweep through large deflections.

By stimulating resonant vibration in two axes, the tip of the fiber cantilever 632 is scanned biaxially in an area filling two dimensional (2-D) scan. By modulating an intensity of light source(s) 620 in synchrony with the scan of the fiber cantilever 632, light emerging from the fiber cantilever 632 forms an image. Descriptions of such a set up are provided in U.S. Patent Publication No. 2014/0003762, which is incorporated by reference herein in its entirety.

A component 644 of an optical coupler subsystem collimates the light emerging from the scanning fiber cantilever 632. The collimated light is reflected by mirrored surface 648 into the narrow distribution planar waveguide 612 which contains the at least one diffractive optical element (DOE) 616. The collimated light propagates vertically (relative to the view of FIG. 6) along the distribution planar waveguide 612 by total internal reflection, and in doing so repeatedly intersects with the DOE 616. The DOE 616 preferably has a low diffraction efficiency. This causes a fraction (e.g., 10%) of the light to be diffracted toward an edge of the larger primary planar waveguide 604 at each point of intersection with the DOE 616, and a fraction of the light to continue on its original trajectory down the length of the distribution planar waveguide 612 via TIR.

At each point of intersection with the DOE 616, additional light is diffracted toward the entrance of the primary waveguide 612. By dividing the incoming light into multiple outcoupled sets, the exit pupil of the light is expanded vertically by the DOE 616 in the distribution planar waveguide 612. This vertically expanded light coupled out of distribution planar waveguide 612 enters the edge of the primary planar waveguide 604.

Light entering primary waveguide 604 propagates horizontally (relative to the view of FIG. 6) along the primary waveguide 604 via TIR. As the light intersects with DOE 608 at multiple points as it propagates horizontally along at least a portion of the length of the primary waveguide 604 via TIR. The DOE 608 may advantageously be designed or configured to have a phase profile that is a summation of a linear diffraction pattern and a radially symmetric diffractive pattern, to produce both deflection and focusing of the light. The DOE 608 may advantageously have a low diffraction efficiency (e.g., 10%), so that only a portion of the light of the beam is deflected toward the eye of the view with each intersection of the DOE 608 while the rest of the light continues to propagate through the waveguide 604 via TIR.

At each point of intersection between the propagating light and the DOE 608, a fraction of the light is diffracted toward the adjacent face of the primary waveguide 604 allowing the light to escape the TIR, and emerge from the face of the primary waveguide 604. In some embodiments, the radially symmetric diffraction pattern of the DOE 608 additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 604 by a multiplicity of DOEs 608 at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Example Optical Systems for Eye Imaging with an Off-Axis Imager

The eyes of the wearer of a head mounted display (HMD) (e.g., the wearable display system 200 shown in FIG. 2) can be imaged using a reflective off-axis Diffractive Optical Element (DOE), which in some implementations may be a Holographic Optical Element (HOE). The resulting images can be used to track an eye or eyes, image the retina, reconstruct the eye shape in three dimensions, extract biometric information from the eye (e.g., iris identification), etc.

There are a variety of reasons why a head mounted display (HMD) might use information about the state of the eyes of the wearer. For example, this information can be used for estimating the gaze direction of the wearer or for biometric identification. This problem is challenging, however, because of the short distance between the HMD and the wearer's eyes. It is further complicated by the fact that gaze tracking requires a larger field of view, while biometric identification requires a relatively high number of pixels on target on the iris. For an imaging system which will attempt to accomplish both of these objectives, the requirements of the two tasks are largely at odds. Finally, both problems are further complicated by occlusion by the eyelids and eyelashes. Embodiments of the imaging systems described herein address some or all of these problems. The various embodiments of the imaging systems 700 described herein with reference to FIGS. 7A-7H can be used with HMD including the display devices described herein (e.g., the wearable display system 200 shown in FIG. 2, the display system 400 shown in FIGS. 4 and 6).

Figure 7A:
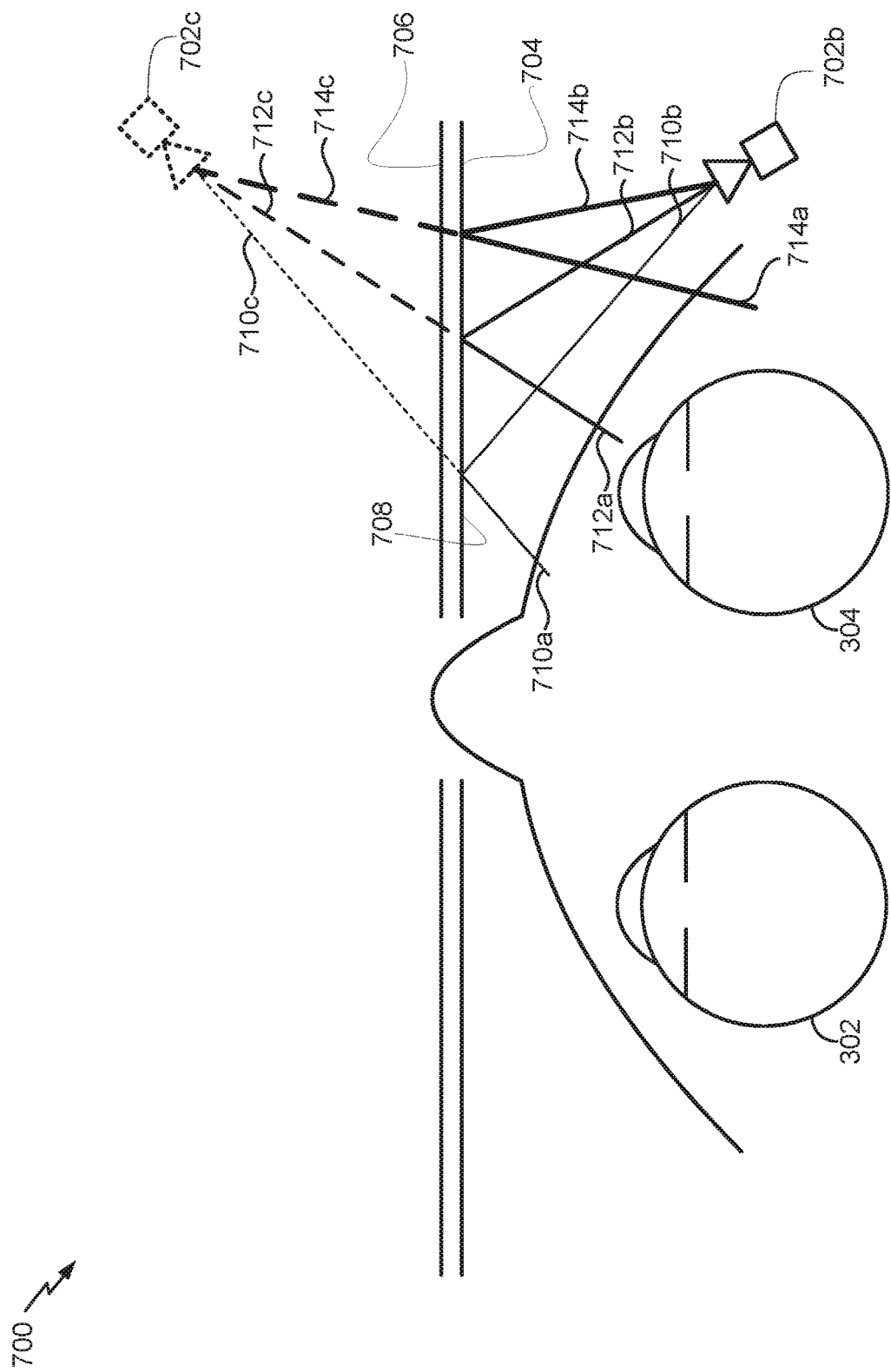
FIGS. 7A-7F schematically illustrate examples of imaging systems comprising a forward-facing camera that images a wearer's eye using a reflective off-axis Diffractive Optical Element (DOE).

FIG. 7A schematically illustrates an example of an imaging system 700 that comprises an imager 702b which is used to view the eye 304, and which is mounted in proximity to the wearer's temple (e.g., on a frame 212 of the wearable display system 200, for example, an ear stem). In other embodiments, a second imager is used for the wearer's other eye 302 so that each eye is separately imaged. The imager 702b can include an infrared digital camera that is sensitive to infrared radiation. The imager 702b is mounted so that it is facing forward (in the direction of the wearer's vision), rather than facing backward and directed at the eye 304 (as with the camera 452 shown in FIG. 4). By disposing the imager 702b nearer the ear of the wearer, the weight of the imager 702b is also nearer the ear, and the HMD may be easier to wear as compared to an HMD where the imager is backward facing and disposed nearer to the front of the HMD (e.g., close to the display 208). Additionally, by placing the forward-facing imager 702b near the wearer's temple, the distance from the wearer's eye 304 to the imager is roughly twice as large as compared to a backward-facing imager disposed near the front of the HMD (e.g., compare with the camera 452 shown in FIG. 4). Since the depth of field of an image is roughly proportional to this distance, the depth of field for the forward-facing imager 702b is roughly twice as large as compared to a backward-facing imager. A larger depth of field for the imager 702b can be advantageous for imaging the eye region of wearers having large or protruding noses, brow ridges, etc.

The imager 702b is positioned to view an inside surface 704 of an otherwise transparent optical element 706. The optical element 706 can be a portion of the display 208 of an HMD (or a lens in a pair of eyeglasses). The optical element can be transmissive to at least 10%, 20%, 30%, 40%, 50%, or more of visible light incident on the optical element. In other embodiments, the optical element 706 need not be transparent (e.g., in a virtual reality display). The optical element 706 can comprise a reflective element 708. The reflective element 708 can be a surface reflecting a first range of wavelengths while being substantially transmissive to a second range of wavelengths (that is different from the first range of wavelengths). The first range of wavelengths can be in the infrared, and the second range of wavelengths can be in the visible. For example, the reflective element 708 can comprise a hot mirror, which reflects infrared light while transmitting visible light. In such embodiments, infrared light 710a, 712a, 714a from the wearer propagates to and reflects from the optical element 706, resulting in reflected infrared light 710b, 712b, 714b which can be imaged by the imager 702b. In some embodiments, the imager 702b can be sensitive to or able to capture at least a subset (such as a non-empty subset and/or a subset of less than all) of the first range of wavelengths reflected by the reflective element 708. For example, the reflective element 708 may reflect infrared light in the a range of 700 nm to 1.5 μm, and the imager 702b may be sensitive to or able to capture near infrared light at wavelengths from 700 nm to 900 nm. As another example, the reflective element 708 may reflect infrared light in the a range of 700 nm to 1.5 μm, and the imager 702b may include a filter that filters out infrared light in the range of 900 nm to 1.5 μm such that the imager 702b can capture near infrared light at wavelengths from 700 nm to 900 nm.

Visible light from the outside world 456 is transmitted through the optical element 706 and can be perceived by the wearer. In effect, the imaging system 700 shown in FIG. 7A acts as if there were a virtual imager 702c directed back toward the wearer's eye 304. The virtual imager 702c can image virtual infrared light 710c, 712c, 714c (shown as dotted lines) propagated from the wearer's eye 304 through the optical element 706. Although the hot mirror (or other DOE described herein) can be disposed on the inside surface 704 of the optical element 706, this is not a limitation. In other embodiments, the hot mirror or DOE can be disposed on an outside surface of the optical element 706 or within the optical element 706 (e.g., a volume HOE).

Figure 7B:
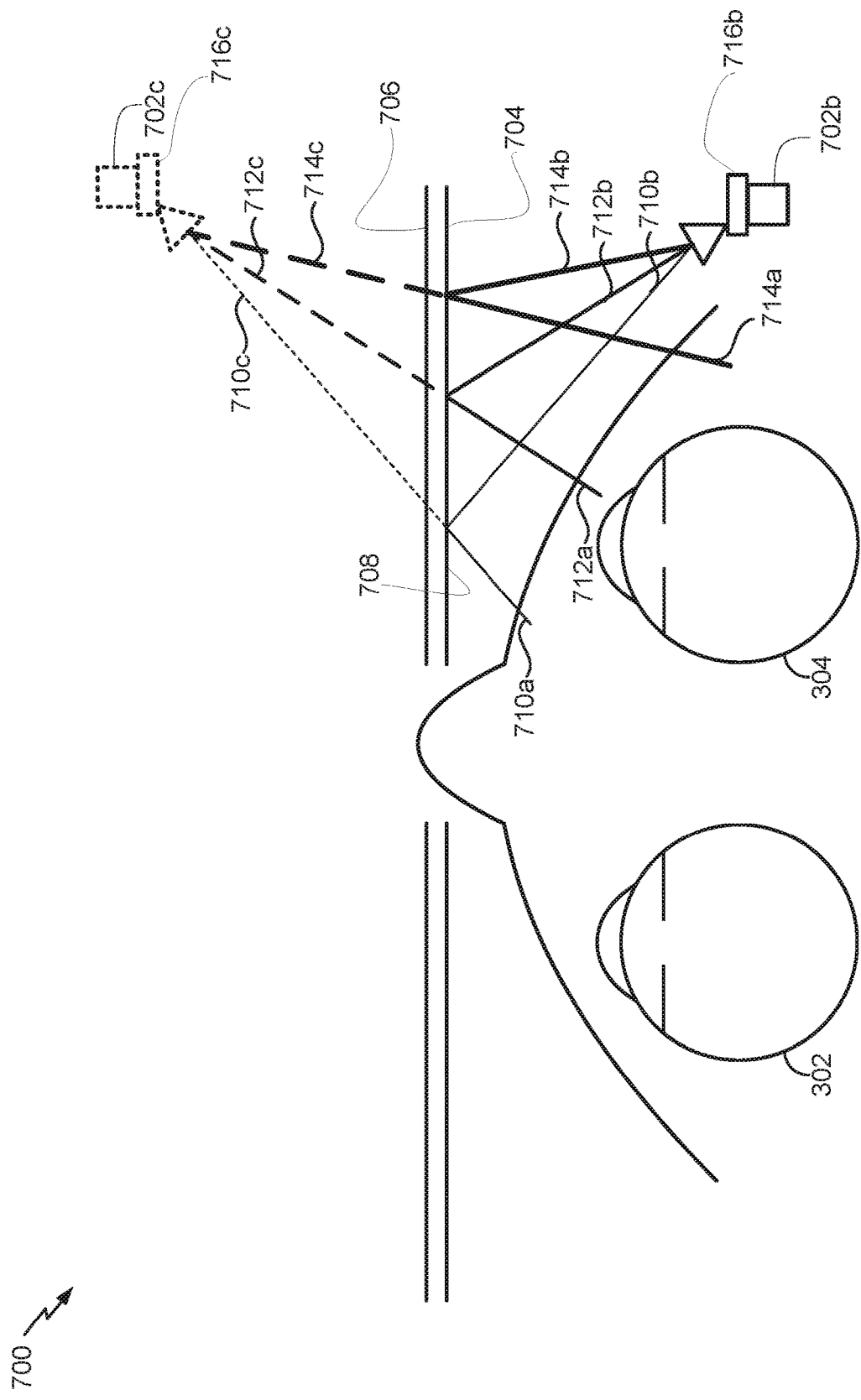

FIG. 7B schematically illustrates another example of the imaging system 700. In this embodiment, perspective distortions may be reduced or eliminated by the use of a perspective control lens assembly 716b (e.g., a shift lens assembly, a tilt lens assembly, or a tilt-shift lens assembly) with the imager 702b. In some embodiments, the perspective control lens assembly 716b may be part of the lens of the imager 702b. The perspective control lens 716b can be configured such that a normal to the imager 702b is substantially parallel to a normal to the region of the surface 704 that includes the DOE (or HOE) or hot mirror. In effect, the imaging system 700 shown in FIG. 7B acts as if there were a virtual imager 702c with a virtual perspective control lens assembly 716c directed back toward the wearer's eye 304.

Figure 7C:
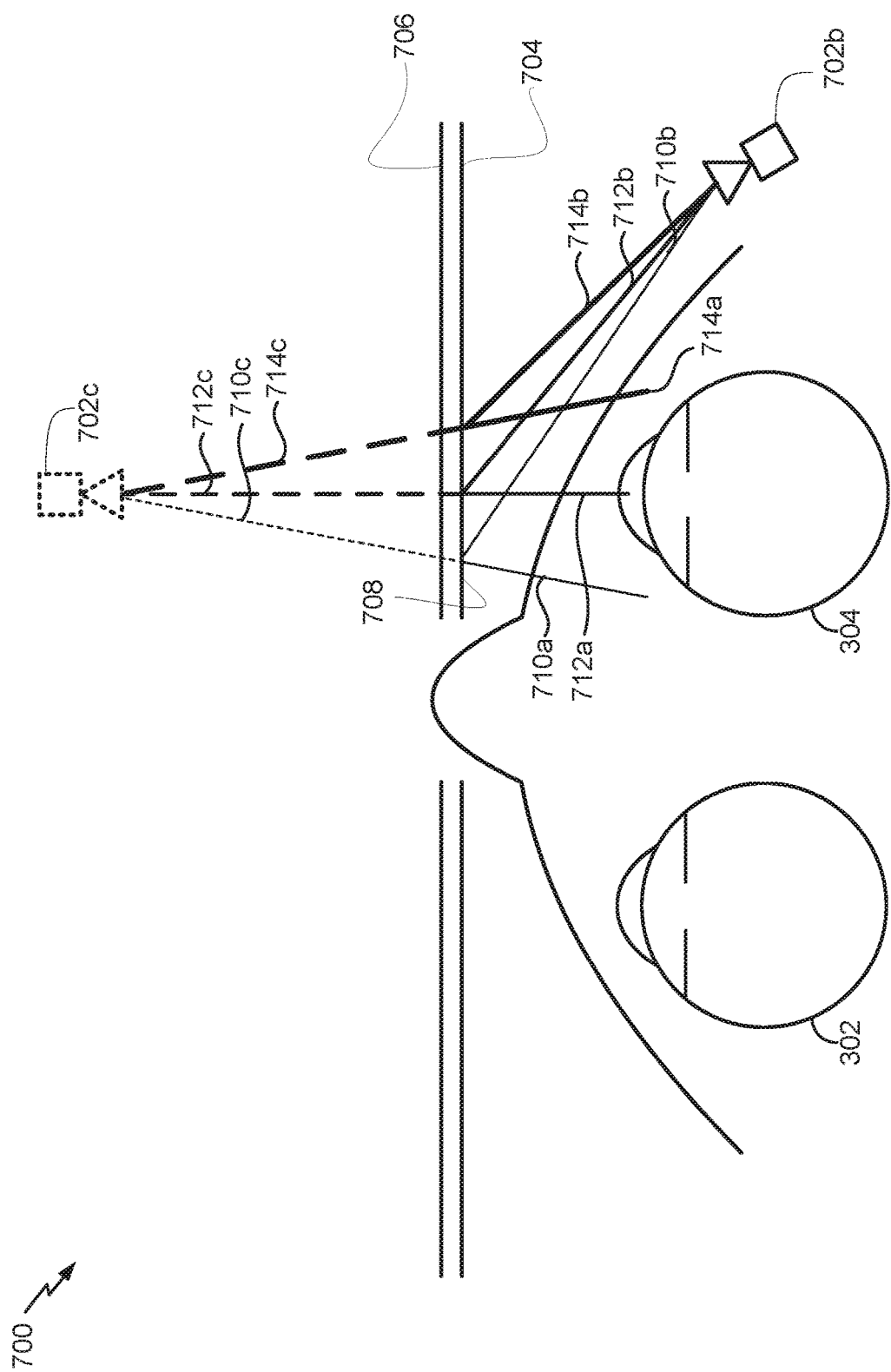
Figure 7D:
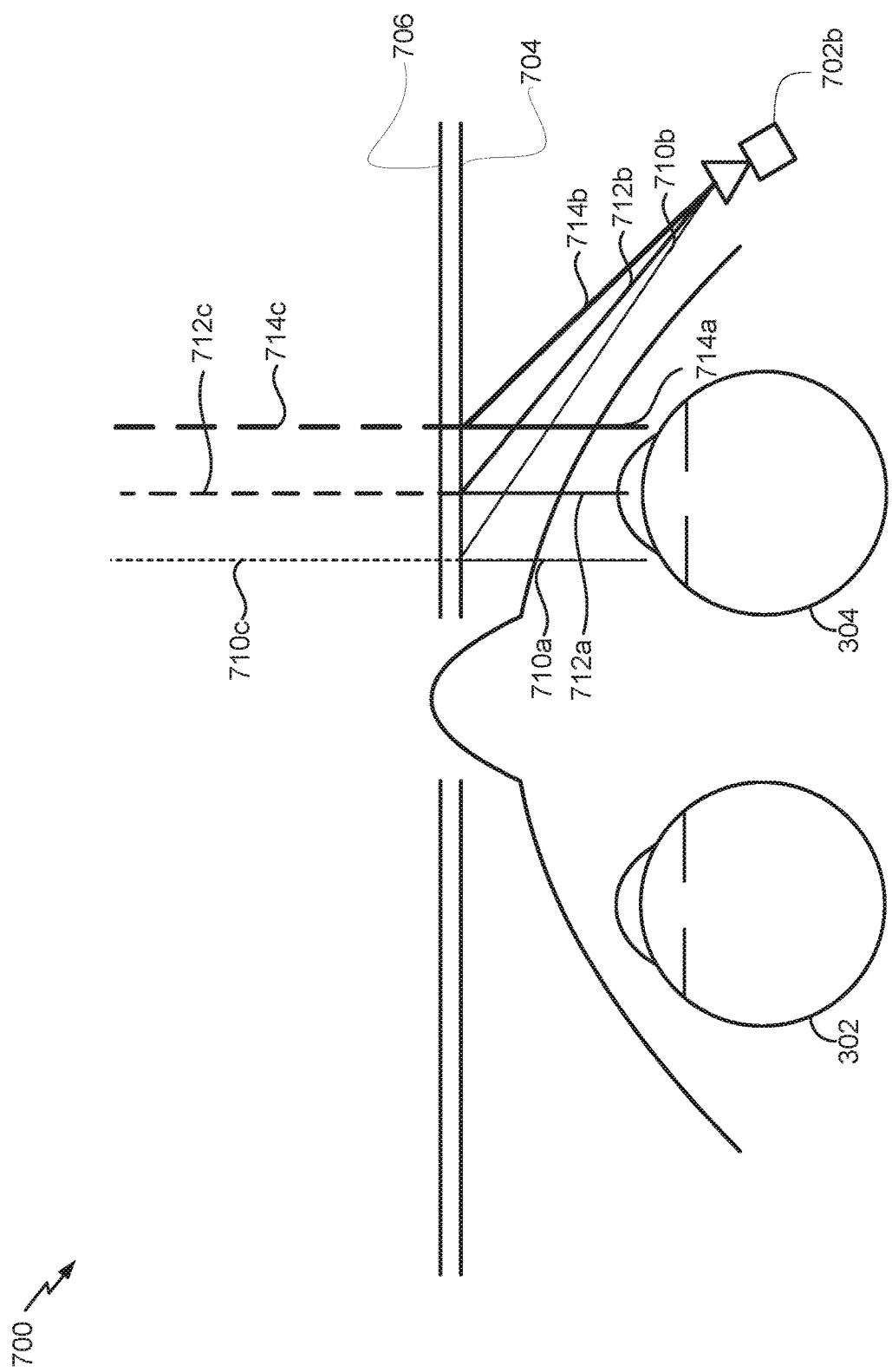

Additionally or alternatively, as schematically shown in FIG. 7C, the reflective element 708 of the optical element 706 may have, on its surface 704, an off axis holographic mirror (OAHM), which is used to reflect light 710a, 712a, 714a to facilitate viewing of the eye 304 by the camera imager 702b which captures reflected light 710b, 712b, 714b. The OAHM 708 may have optical power as well, in which case it can be an off-axis volumetric diffractive optical element (OAVDOE), as schematically shown in FIG. 7D. In the example shown in FIG. 7D, the effective location of the virtual camera 702c is at infinity (and is not shown in FIG. 7D).

Figure 7E:
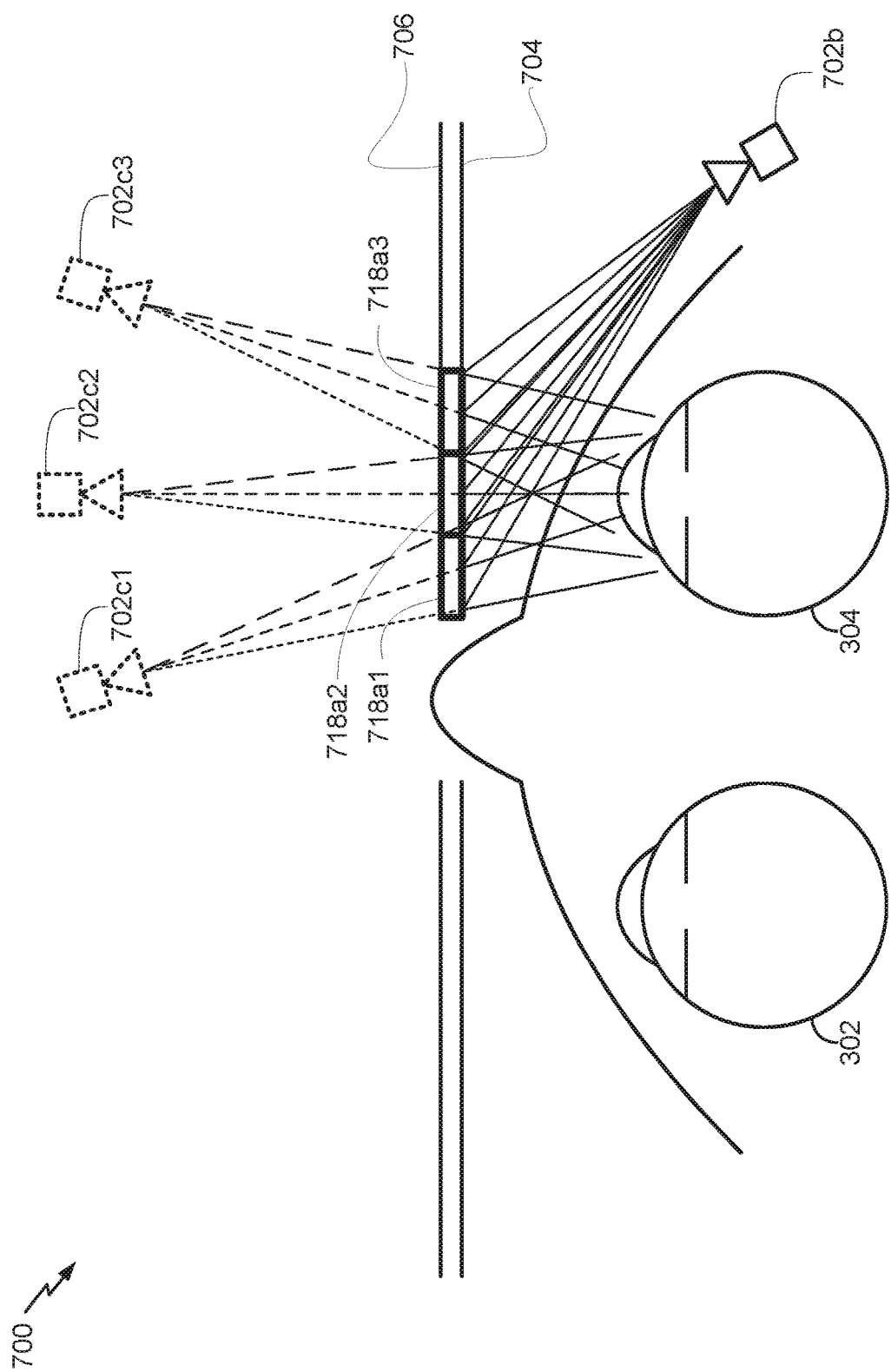

In some embodiments, the HOE (e.g., the OAHM or OAVDOE) or a hot mirror can be divided into a plurality of segments. Each of these segments can have different optical properties or characteristics, including, for example, reflection angles at which the segments reflect the incoming (infrared) light or optical power. The segments can be configured so that light is reflected from each segment toward the imager 702b. As a result, the image acquired by the imager 702b will also be divided into a corresponding number of segments, each effectively viewing the eye from a different angle. FIG. 7E schematically illustrates an example of the display system 700 having an OAHM or hot mirror with three segments 718a1, 718a2, 718a3, each of which acts as a respective virtual camera 702c1, 702c2, 702c3 imaging the eye 304 at a different angular location. Additional examples of display systems with segmented optical elements are described with reference to FIGS. 8 and 10.

Figure 7F:
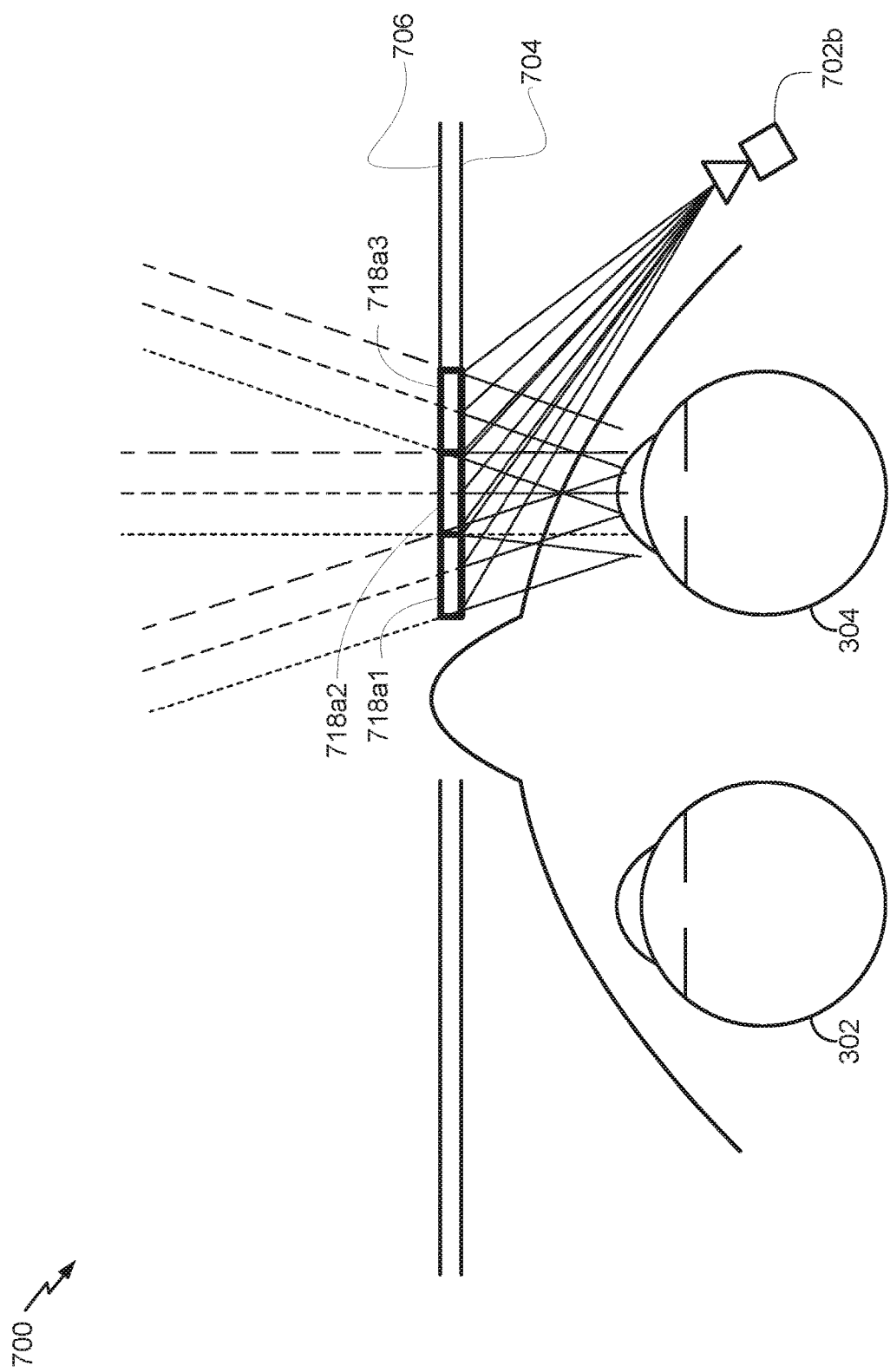

FIG. 7F schematically illustrates another example of the display system 700 having an OAHM or hot mirror with three segments 718a1, 718a2, 718a3, each having optical power (e.g., a segmented OAVDOE) or a different reflection angle, with each segment generating a virtual camera at infinity imaging the eye 304 at a different angular location. Although three segments are schematically illustrated in FIGS. 7E and 7F, this is for illustration and not limitation. In other embodiments, two, four, five, six, seven, eight, nine, or more segments can be utilized. None, some, or all of these segments of the HOE or hot mirror can have optical power.

Figure 7G:
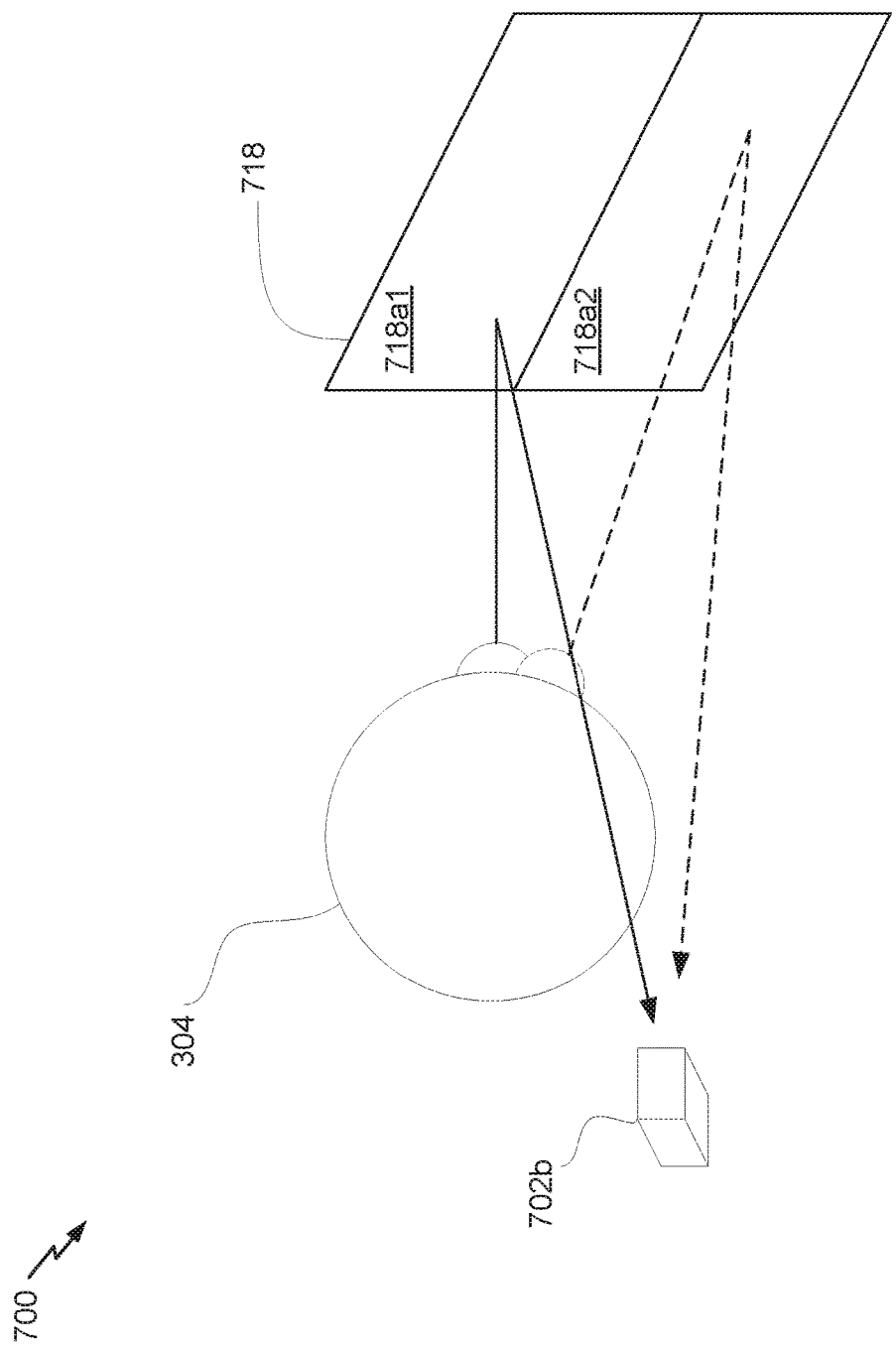
FIGS. 7G and 7H schematically show examples of a DOE having a plurality of segments, each of which can have different optical properties (e.g., reflection angle, optical power, etc.).

The three segments 718a1, 718a2, 718a3 are shown as spaced horizontally across the optical element 706 in FIGS. 7E and 7F. In other embodiments, the segments can be spaced vertically on the optical element 706. For example, FIG. 7G schematically shows a DOE or hot mirror 718 having two vertically spaced segments 718a1 and 718a2, with the segment 718a1 configured to reflect light back toward the imager 702b (which may be in the same general horizontal plane as the segment 718a1), and the segment 718a2 configured to reflect light upwards toward the imager 702b. Similar to bifocal lenses, the arrangement shown in FIG. 7G can be advantageous in allowing the imaging system 700 to use reflection imagery acquired by the imager 702b from the upper segment 718a1 when the wearer is looking forward through the upper portion of the HMD (schematically shown via the solid arrowed line) and to use reflection imagery from the lower segment 718a2 when the wearer is looking downward through the lower portion of the HMD (schematically shown via the dashed arrowed line).

As described with reference to FIGS. 8-10, another arrangement can allow the imaging system 700 to use reflection imagery acquired by the imager 702b from an outer segment when the wearer is looking forward or away from the nose and to use reflection imagery from an inner segment when the wearer is looking toward the nose direction.

Figure 7H:
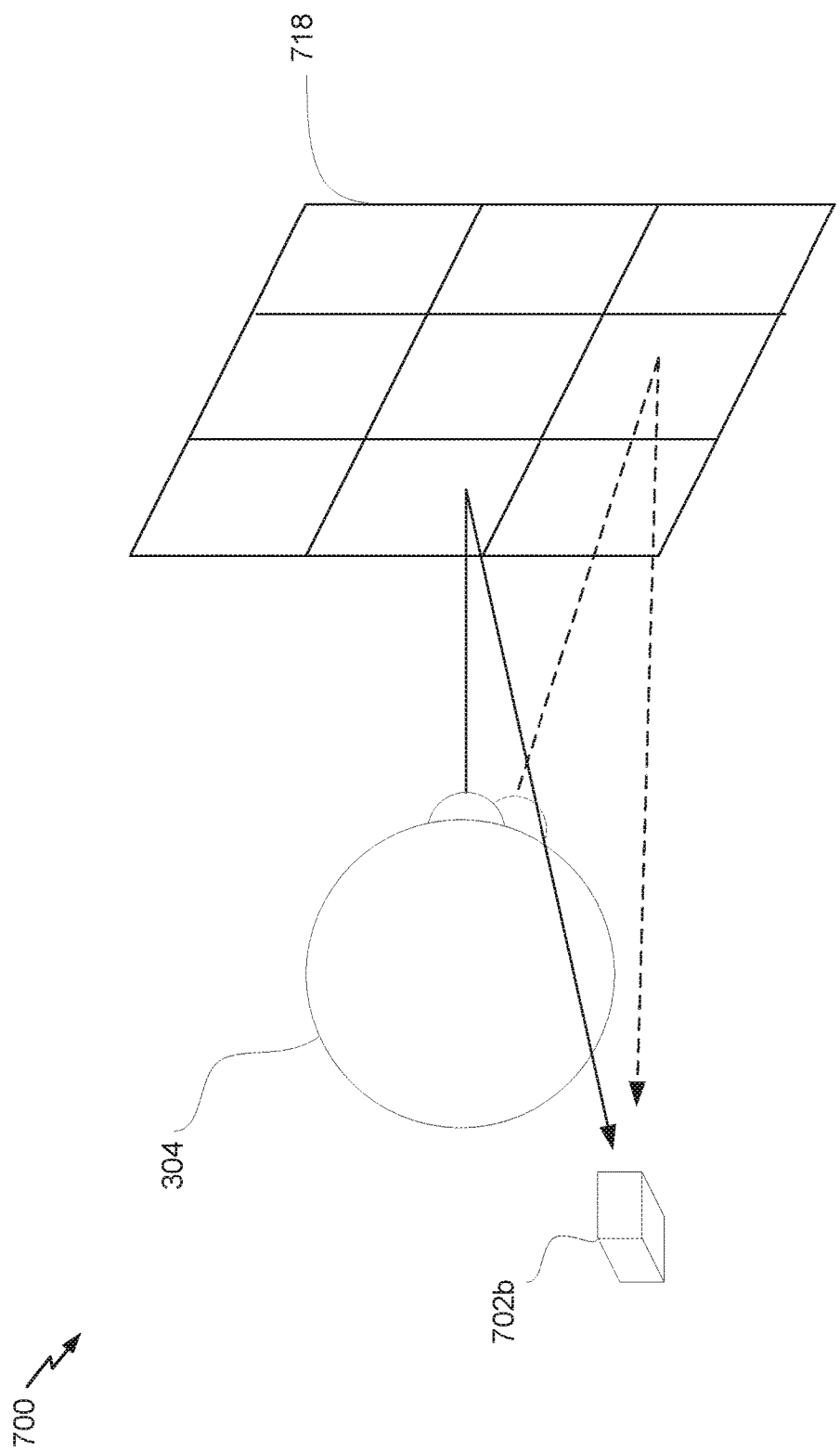

A mix of horizontally spaced and vertically spaced segments can be used in other embodiments. For example, FIG. 7H shows another example of the HOE or hot mirror 718 with a 3×3 array of segments. The imager 702b can acquire reflection data from each of these nine segments, which represent light rays coming from different areas of and angular directions from the eye region. Two example light rays propagating from the eye region to the HOE or hot mirror 718 and reflecting back to the imager 702b are shown as solid and dashed lines. The imaging system 700 (or processing module 224 or 228) can analyze the reflection data from the plurality of segments to multiscopically calculate the three-dimensional shape of the eye or the gaze direction (e.g., eye pose) of the eye.

Embodiments of the optical system 700 utilizing segments may have multiple benefits. For example, the segments can be used individually, by selecting the particular segments which best suit a particular task, or they can be used collectively to multiscopically estimate the three-dimensional shape or pose of the eye. In the former case, this selectivity can be used to, for example, select the image of the wearer's iris which has the least occlusion by eyelids or eyelashes. In the latter case, the three dimensional reconstruction of the eye can be used to estimate orientation (by estimation of, for example, the location of the bulge of the cornea) or accommodation state (by estimation of, for example, the lens induced distortion on the apparent location of the pupil).

Angular Segmentation

In certain implementations, it may be advantageous to provide a greater range of angles over which the user's eye can be tracked using the embodiments described herein. For example, it may be advantageous to increase a gaze sensitivity of any eye-tracking imaging devices (e.g., cameras) along at least a portion of a gaze orientation of the eye.

Figure 8:
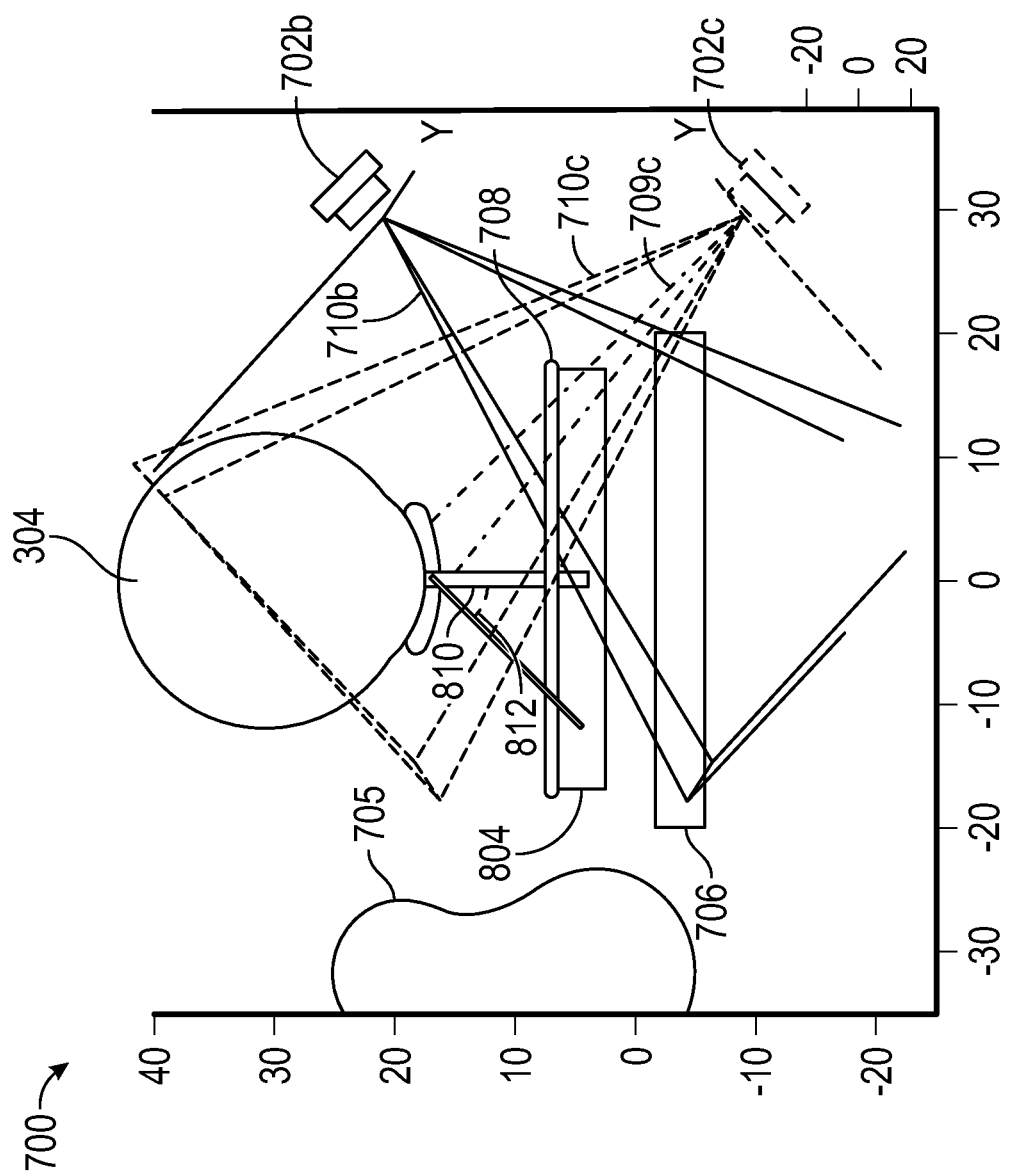
FIG. 8 shows another example of an optical system for eye tracking.

FIG. 8 shows another example of an optical system 700 that can perform eye tracking. The optical system of FIG. 8 shares many common features with features of the optical system 700 shown in FIG. 7A. FIG. 8 shows an imaging device 702b that is configured to image the user's eye 304. As light reflects off the user's eye 304 or a portion thereof (e.g., cornea, retina, iris, sclera, etc.), the light may reflect off a reflective surface of an at least partially reflective element 708. The reflective element 708 may be disposed on a substrate 804, which may provide stability to the reflective surface (e.g., which may comprise a portion of a thin film or coating). The substrate 804 may include a polymer material, such as a plastic. Disposed opposite the substrate 804 (relative to the user's eye 304) may be an optical element 706. The optical element 706 may be a variable focus element (VFE) or a light field display or other display element configured to project virtual content to the user's eye. For example, the optical element 706 may include the waveguide assembly 405 of FIG. 4 or the waveguide apparatus described with reference to FIGS. 4-6. In some embodiments, the substrate 804 and the optical element 706 may be a single element.

The reflective element 708 may be configured to substantially reflect light of a certain range of wavelengths and/or to substantially transmit light of a second range of wavelengths. The first and second ranges of wavelengths may be different from each other. The first range of wavelengths may comprise substantially infrared wavelengths or a particular subrange therein (e.g., the near infrared). For example, the first range may include wavelengths of about 700 nm, 750 nm, 800 nm, 850 nm, 900 nm, 950 nm, 1000 nm, any value therebetween, or fall within a range having any endpoints therein. The second range of wavelengths may comprise substantially visible wavelengths or a particular subrange therein. For example, the second range may include wavelengths of about 390 nm, 450 nm, 500 nm, 550 nm, 600 nm, 650 nm, 700 nm, any value therebetween, or fall within a range having any endpoints therein. The reflective element 708 may comprise a hot mirror. The reflective element 708 may include a reflective material, a coating, a diffractive optical element (DOE) and/or a holographic optical element (e.g., the HOE 718, the OAHM described above). In some embodiments, the first and second wavelength ranges may have at least partial overlap with one another.

As described with reference to FIGS. 7A-7G, light from the eye reflects off the reflective element 708 and is imaged by the physical camera 702b (e.g., near the user's temples). This optical arrangement functions as if a virtual camera 702c, positioned in front of the user's eye, images light 709c as if coming directly from the eye.

A gaze angle 812 of the user's eye 304 can be defined between an optical axis 810 and a gaze direction of the user's eye 304. The optical axis 810 may be in the direction of the natural resting pose of the eye (e.g., pointing forward). The gaze angle 812 is zero when the user's gaze is in the direction of the optical axis 810, negative when the user's gaze is toward the user's nose 705 (e.g., in the nasal direction), and positive when the user's gaze is toward the user's nearest temple (e.g., in the temporal direction, away from the nose 705, and toward the corresponding imaging device 702b). As shown, an eye box imaged by the physical imager 702b is represented by a prism 710b and the eye box of the virtual imager 702c is represented by a prism 710c.

Figure 9:
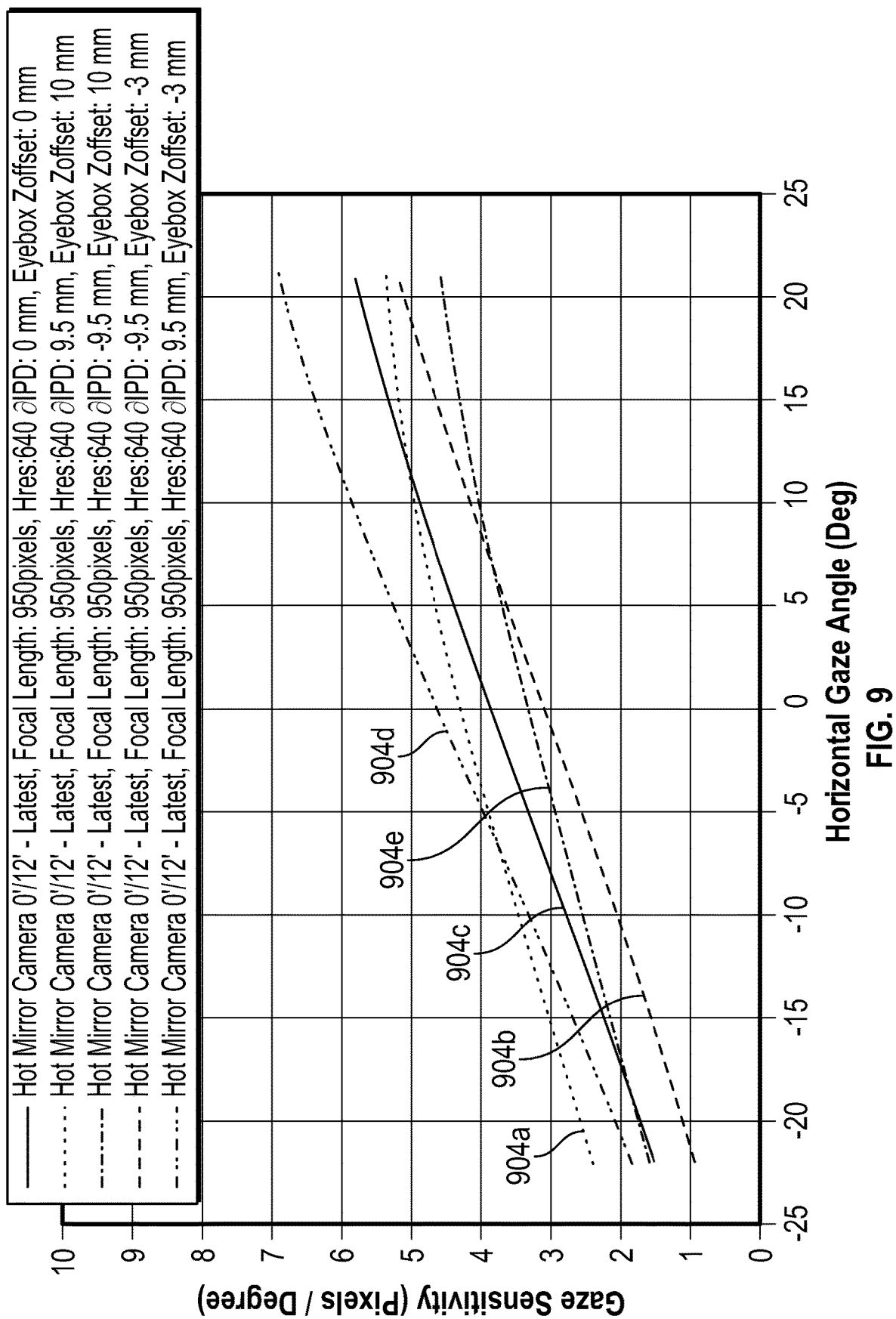
FIG. 9 shows a series of plots that represent examples of gaze sensitivity (in pixels per degree) over a horizontal gaze angle (in degrees) of various configurations of hot mirrors in relation to different differentials of interpupillary distances (IPD) and/or to different eyebox offsets along the axial direction (z-axis).

FIG. 9 shows a series of plots 904a-904e that represent gaze sensitivity (in pixels per degree) over a horizontal gaze angle (in degrees) for various configurations of hot mirrors in relation to different differentials of interpupillary distance (IPD) or to different eyebox offsets along the axial direction (z-axis). In these examples, the hot mirror was not segmented and was generally similar to the arrangement shown in FIG. 8. The eyebox can define a region of interest comprising horizontal and vertical dimensions that may be limited by a distance of the eye to the optical element 706. The eyebox may have dimensions of about 30 mm by 30 mm by 13 mm, for example. The interpupillary distance (IPD) may be in a range of up to about 9.5 mm between both eyes.

The gaze angle 812 can be in a range of about ±22 degrees (horizontal) and ±55 degrees (vertical). Other dimensions are possible.

Gaze sensitivity can be defined as a ratio between the measured movement of eye features (e.g., glints or the pupil) imaged by the imager (in pixels) to the movement of the eye features (in degrees). As can be seen from the examples in FIG. 9, gaze sensitivity may be lower at negative angles (e.g., gaze toward the nose) than at positive angles (e.g., gaze away from the nose toward the temple). This lower sensitivity for nasal gaze directions (negative gaze angles) is likely due to the larger angle between the gaze direction and the virtual camera 702c (which can approach 90 degrees when the user looks directly toward the nose). In contrast, when the user's gaze is more temporal (positive gaze angles), the user is looking more directly at the virtual position of the virtual camera 702c.

Accordingly, it may be beneficial to increase the gaze sensitivity of an imaging device with respect to negative gaze angles (e.g., a nasally-oriented gaze). As described herein, improving nasal gaze sensitivity may be accomplished by orienting a first segment of the reflective element 708 at a non-zero angle relative to a second segment so that the virtual imager 702c can better image the user's eye when looking nasally.

Figure 10:
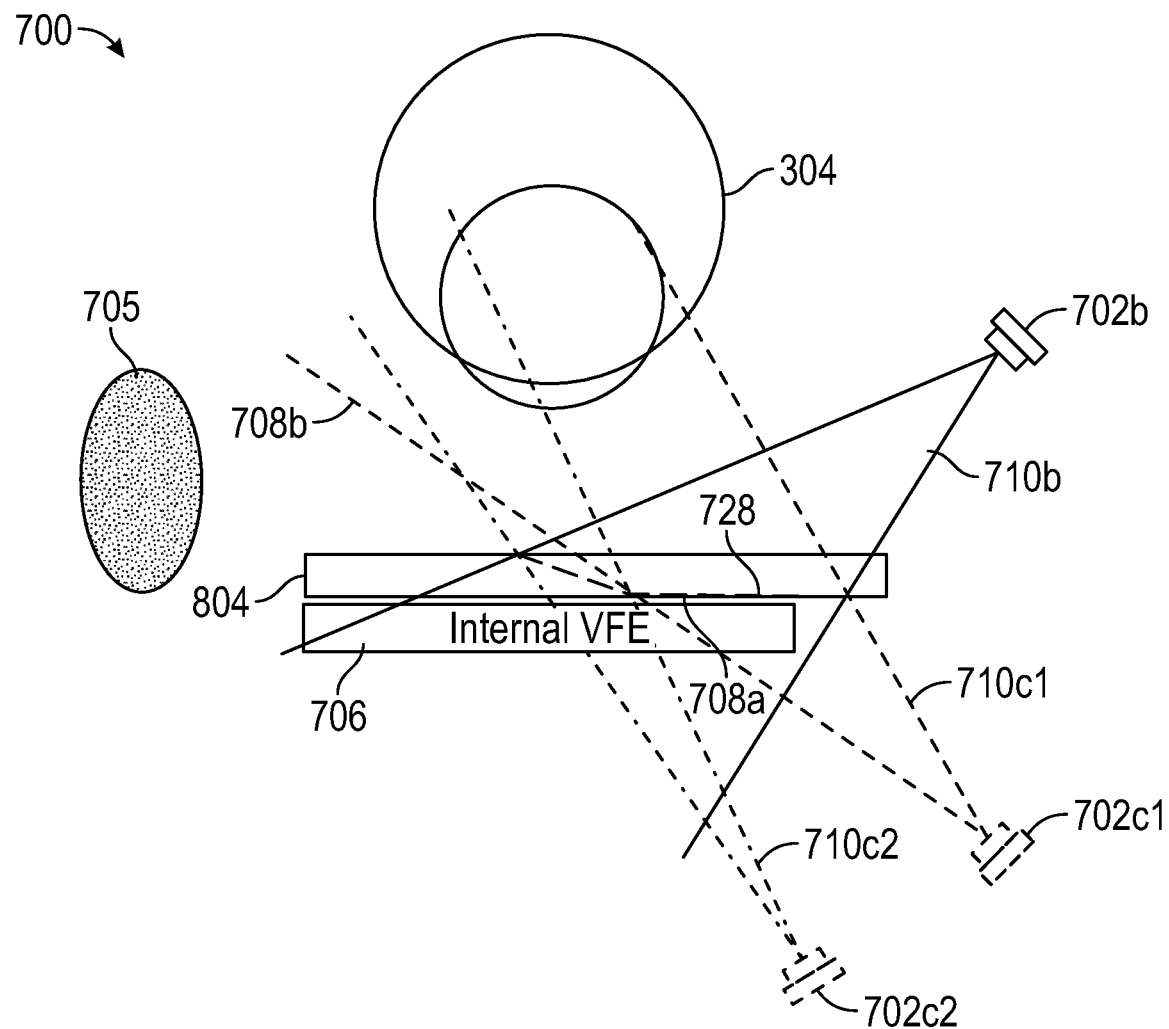
FIG. 10 shows an example optical system having a segmented reflective element.

FIG. 10 shows an example optical system 700 having an angularly segmented reflective element 708. The reflective element 708 may include a first segment 708a and a second segment 708b. The second segment 708b may be angled relative to the first segment 708a. A rise angle 728 may be defined between the second segment 708b and a plane or surface that includes the first segment 708a. The angle 728 may be acute as shown. For example, the angle 728 may be in a range from about 2° to about 35°, in a range from about 5° to about 20°, or some other range. The angle 728 may be about 3°, 5°, 7°, 10°, 12°, 15°, 18°, 20°, 25°, 30°, 33°, 35°, 40°, 50°, 60°, 70°, 80°, any value therebetween, or fall within a range having any endpoints therein. Although two segments 708a, 708b are shown in FIG. 10, this is for illustration and not limitation. For example, as described with reference to FIGS. 7E-7H, any suitable number or arrangement of segments can be used in other embodiments. Further, the first segment 708a may be disposed with a rise angle of 0° (e.g., substantially parallel to a major face of the substrate 804 as shown in FIG. 10). However, in some embodiments, the first segment 708a may be inclined relative to the major face of the substrate 804 and/or of the optical element 706.

As shown in FIG. 10, the angled nature of the two segments 708a, 708b of the reflective element 708 results in corresponding virtual imaging devices 702c1, 702c2, respectively. The first virtual imaging device 702c1 represents imaging from the first segment 708a, and the second virtual imaging device 702c2 represents imaging from the second segment 708b. When the user's eye gaze is more nasal (e.g., toward the nose 705 shown in FIG. 10), the gaze sensitivity of the eye-tracking imaging system is improved, because the virtual camera 702c2 is located more towards the nasal region (as compared to the location of the first virtual camera 702c1). The angle between a nasal gaze direction and the virtual imager 702c2 is reduced, for example, when compared to the corresponding angle for the optical system 700 shown in FIG. 8. Thus, use of the angularly segmented reflective element 708 permits the eye-tracking system to provide improved gaze sensitivity for gaze angles that are nasal (e.g., with virtual imager 702c2) and temporal (e.g., with virtual imager 702c1).

A greater rise angle rise angle 728 can require a greater thickness of the substrate 804. Accordingly, various embodiments can be used that strike an effective balance between achieving a relatively thin substrate 804 while providing a relatively high gaze sensitivity at nasal angles. In some such embodiments, the angle 728 is about 15°, and the thickness of the substrate 804 is about 2 mm.

While discrete, straight angled segments have been described for purpose of illustration, angled portions of the reflective element 708 may be at least partially curved, such as, e.g., a portion of a surface of a quadric (e.g., a sphere, ellipsoid, paraboloid, or hyperboloid). One or more of the segments can have optical power. Additionally or alternatively, multiple segments may be angled horizontally (e.g., as shown in FIG. 10) or a vertically (e.g., in or out of the plane of FIG. 10). Many alternatives are possible.

Figure 11:
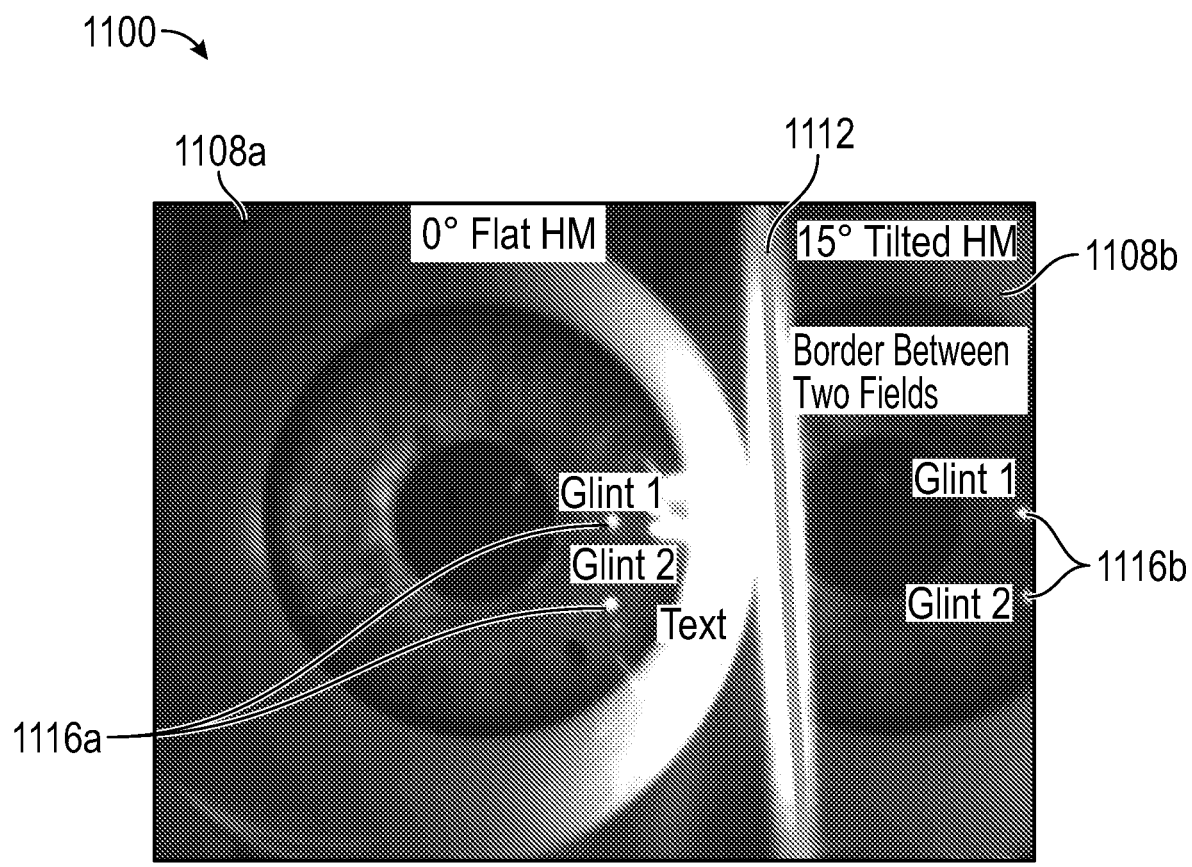
FIG. 11 shows an example eye image reflected from an embodiment of an angularly segmented hot mirror.

FIG. 11 shows an example image 1100 of an eye from an angularly segmented reflective element. In this experiment, the reflective element was a hot mirror (HM) that included a flat segment and an angled segment at 15°. The image 1100 includes a first image portion 1108a and a second image portion 1108b separated by a border 1112. The image of the border 1112 may be an artifact of the how the reflective element 708 (e.g., shown in FIG. 10) is formed for this experiment. The image 1100 shows the eye and glints 1116a, 1116b of light sources reflected from the cornea of the eye. Note that the glints 1116a and 1116b can be seen in the image portions 1108a, 1108b, respectively.

Example Methods for Manufacturing an Angularly Segmented Reflective Element

FIGS. 12A-12E show various stages of an example manufacturing process for an optical element 1224 (e.g., an angularly segmented hot mirror). The manufacturing process can comprise injection molding and may include two injection molding stages (e.g., a first injection molding stage described below with reference to FIG. 12A and a second injection molding stage described below with reference to FIG. 12D).

Figure 12A:
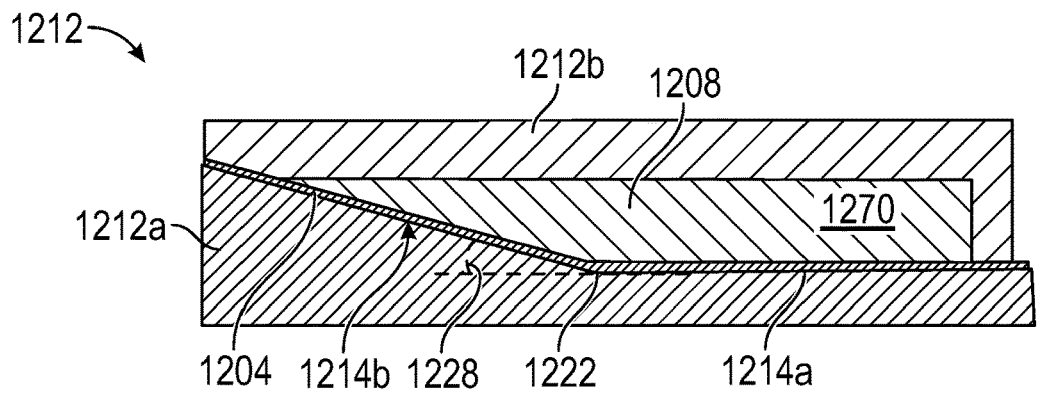
FIGS. 12A-12E show various stages of an example manufacturing process for an optical element (e.g., comprising an angularly segmented hot mirror).

FIG. 12A shows a first injection molding stage where a first transparent material 1208 is injected into a first mold 1212. The first mold 1212 can include multiple portions, such as first portion 1212a and second portion 1212b as shown that are joined together to form a cavity 1270 into which the first transparent material 1208 is injected. To form an angled segment of the optical element 1224, the second surface 1214b may be angled relative to the first surface 1214a by a rise angle 1228. The rise angle 1228 can be selected to provide the rise angle 728 of the second segment 708b described with reference to FIG. 10. The rise angle 1228 may be defined between the second surface 1214b and a plane or surface that includes at least a portion of the first surface 1214a. The angle may be acute as shown. The rise angle 1228 may be in a range from about 2° to about 35°, in a range from about 5° to about 20°, or some other range. For example, the angle 1228 may be about 3°, 5°, 7°, 10°, 12°, 15°, 18°, 20°, 25°, 30°, 33°, 35°, 40°, 50°, 60°, 70°, 80°, any value therebetween, or fall within a range having any endpoints therein.

A reflective material 1204 can be disposed on or adjacent to a first surface 1214a of the first portion 1212a and a second surface 1214b of the second portion 1212b. The reflective material 1204 can comprise a hot mirror film. For example, the reflective material 1204 can be substantially transmissive in the visible portion of the electromagnetic spectrum and substantially reflective in the infrared portion of the electromagnetic spectrum. For example, the reflective material 1204 may be transmissive to at least 50%, 60%, 70%, 80%, 90%, or more of visible light incident thereon. The reflective material 1204 may be reflective of at least 30%, 40%, 50%, 60%, 70%, 80%, 90%, or more of infrared light incident thereon. As an example, the hot mirror film may include a 3M HM-825 nm film available from the 3M Corporation.

The reflective material 1204 may be configured to substantially reflect light of a certain range of wavelengths or to substantially transmit light of a second range of wavelengths. The first and second ranges of wavelengths may be different from each other. The first range of wavelengths may comprise infrared wavelengths or a particular subrange of infrared wavelengths. For example, the first range may include wavelengths of about 700 nm, 750 nm, 800 nm, 850 nm, 900 nm, 950 nm, 1000 nm, any value therebetween, or fall within a range having any endpoints therein. The second range of wavelengths may comprise substantially visible wavelengths or a particular subrange of visible wavelengths. For example, the second range may include wavelengths of about 390 nm, 450 nm, 500 nm, 550 nm, 600 nm, 650 nm, 700 nm, any value therebetween, or fall within a range having any endpoints therein. The reflective material 1204 may include a reflective material, a coating, and/or a holographic or diffractive optical element (e.g., the HOE 718, the OAHM described above). In some embodiments, the first and second wavelength ranges may have some overlap with one another. The reflective material 1204 may have a thickness of less than 2 mm. For example, the thickness may be about 0.1 mm, 0.2 mm, 0.3 mm, 0.4 mm, 0.5 mm, 0.6 mm, 0.7 mm, 0.8 mm, 0.9 mm, 1 mm, 1.2 mm, 1.5 mm, 1.7 mm, any value therebetween, or fall within a range having any endpoints therein.

One or more fluid (e.g., air or gas) vents may be disposed along the first surface 1214a, the second surface 1214b, or at a junction 1222 between the surfaces 1214a, 1214b. Use of such vent(s) may be advantageous in allowing the reflective material 1204 to be pushed against the surfaces 1214a, 1214b by the pressure of the transparent material 1208 when the material 1208 is injected into the first mold 1212. For example, allowing gas (e.g., air) that is initially in the cavity 1270 to vent as the material 1208 is injected into the cavity 1270 may permit the reflective material 1204 (which may be in the form of a thin film) to form a sharp corner at the junction 1222 between the two segments.

The first transparent material 1208 can be transparent in the visible and the infrared spectral regions in order to permit visible and infrared light to pass through the material 1208 to reach the reflective element 1204. As described above, the reflective element 1204 may then reflect the infrared components of the incident light. The first transparent material 1208 may include a polymer or a plastic. For example, the first transparent material 1208 may include elastomers, thermoplastics, thermosets, or other polymers. Example materials include polyamide, polypropylene, high density polyethylene, acrylonitrile butadiene styrene, polycarbonate, polymethyl methacrylate (PMMA), or any combination of these.

Figure 12B:
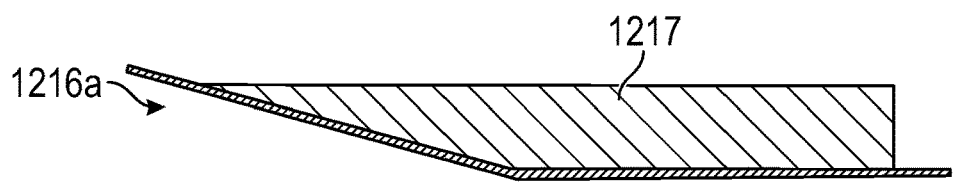

The injection molding stage described with reference to FIG. 12A results in formation of an intermediate structure 1216a that can be removed from the first mold 1212. The intermediate structure 1216a may be referred to as a first molded component, because it will be used in a second injection molding stage described with reference to FIG. 12D. FIG. 12B shows the intermediate structure 1216a outside of the first mold 1212. In some methods, pieces of the reflective material 1204 may extend beyond the body 1217 of the intermediate structure 1216a, and these pieces may be removed at one or more termination points 1218a, 1218b (e.g., by cutting, trimming, polishing, etc.) to form the intermediate structure 1216.

While the intermediate structure 1216 may be formed as described above in which the reflective material 1208 is included within the first mold 1212, in other embodiments, the body 1217 of the intermediate structure 1216 can be formed first (e.g., via injection molding) and then the reflective material 1204 can be adhered or attached to or coated or deposited on the body 1217.

The manufacturing method may optionally include a second injection molding stage in which a second body 1219 is formed on the intermediate structure to provide the optical element 1224. FIG. 12D shows an example of this second injection molding stage. The intermediate structure 1216 may be disposed in a second mold 1220. The second mold 1220 may include two or more portions, such as a first portion 1220a and a second portion 1220b as shown with a cavity 1280 formed between them. The first and second portions 1220a, 1220b of the second mold 1220 may be shaped to form two major surfaces that are substantially flat. The two major surfaces may be substantially parallel to each other so that the finished optical element has substantially flat outer surfaces. Other relationships are possible, for example, the inner surfaces of the first or the second portions 1220a, 1220b can be curved, which provides optical power to the optical element or to fit better when attached to a display element 706.

A second transparent material 1230 may be injected into the second cavity 1280 of the second mold 1220. The second transparent material 1230 may be injected such that the reflective material 1204 is disposed between the first body 1217 and the cavity 1280. The second transparent material 1230 may be substantially the same as the first transparent material 1208. Other materials are possible, for example, the first and second materials can have different indices of refraction or different visible or infrared transmissivities.

Figure 12C:
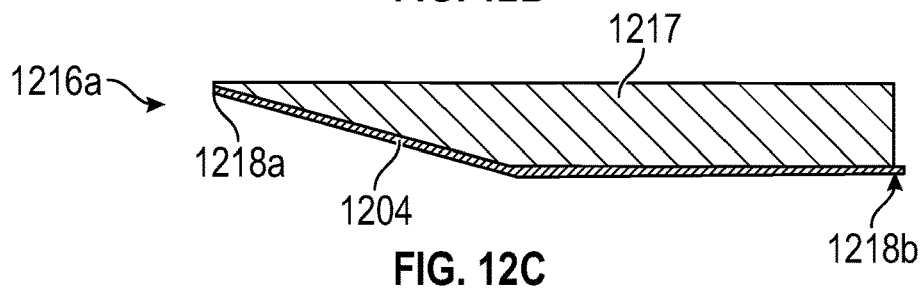
Figure 12D:
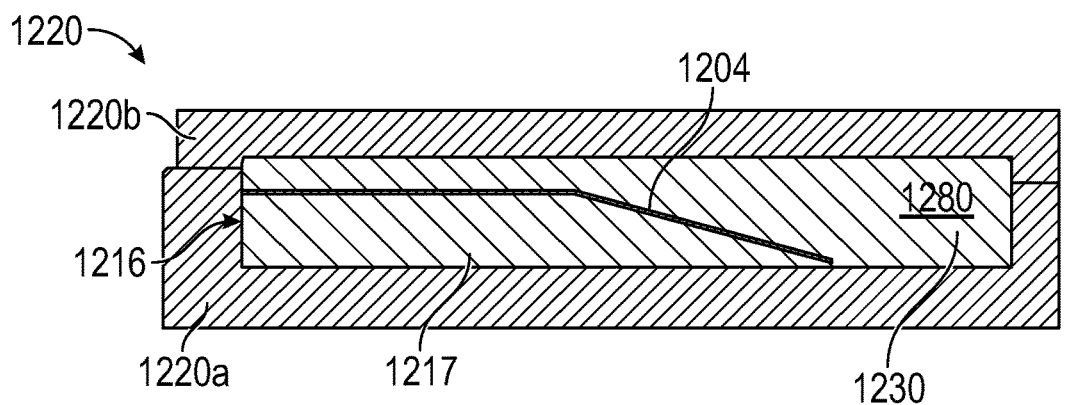
Figure 12E:
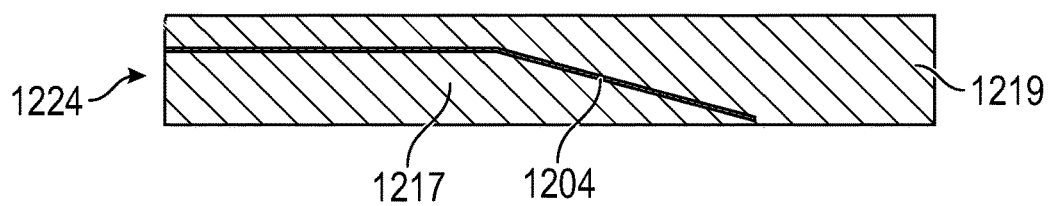

The second stage of injection molding forms the optical element 1224, which is shown in FIG. 12E, removed from the second mold 1220. As can be seen, the reflective element 1204 is disposed between the first body 1217 (formed during the first injection molding stage) and the second body 1219 (formed during the second injection molding stage). The two, transparent bodies 1217, 1219 thereby protect the reflective element 1204 from exposure to environmental conditions (e.g., dust, moisture, etc.) or from touching by the user of the wearable system 200. The optical element 1224 can be used as the angular segmented reflective element described with reference to FIG. 10 (e.g., the reflective element 708 and the substrate 804). For example, the optical element 1224 can be adhered or attached to the optical display element 706.

While the optical element 1224 may be formed as described above, in other embodiments, the second body 1219 can be formed separately (e.g., via injection molding) and then can be adhered or attached to the intermediate structure 1216.

The manufacturing process for the optical element can include additional, optional, or different stages. For example, FIGS. 13A-13B show an example where the optical element 1224 is formed to include one or more light sources.

Figure 13A:
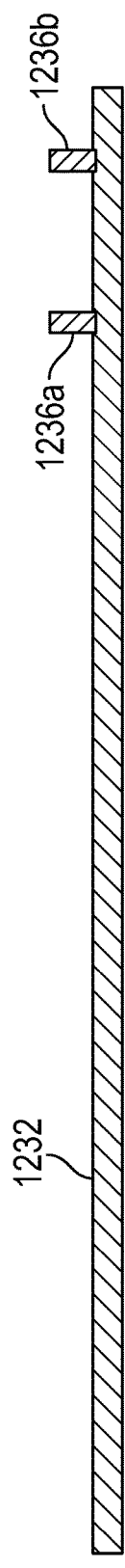
FIGS. 13A-13C show optional stages for manufacturing the optical element to include light sources (e.g., infrared LEDs).

FIG. 13A shows an example of a polymer layer 1232 comprising two light sources 1236a and 1236b. Electronic circuitry may be included on or within the polymer layer 1232 to provide electrical power to the light sources 1236a, 1236b. The circuitry may be formed from conductive material that is transmissive to visible light such as, e.g., indium-tin-oxide (ITO). One or both of the light sources 1236a, 1236b may be configured to emit infrared light, such as at wavelengths of about 700 nm, 750 nm, 800 nm, 850 nm, 900 nm, 950 nm, 1000 nm, any value therebetween, or fall within a range having any endpoints therein. In some embodiments, the light sources 1236a, 1236b comprise SFH4055 infrared light emitting diodes (LEDs) (available from Osram Opto Semiconductors). Although two light sources are shown in FIG. 13A, 1, 3, 4, 5, 6, or more light sources can be used in other embodiments.

The polymer layer 1232 may comprise any polymer, such as a plastic. For example, the polymer layer 1232 may include polyethylene terephthalate (PET). The polymer layer 1232 may be a rigid material. The polymer layer 1232 may have a thickness of less than 1 mm. For example, the thickness may be 0.05 mm, 0.1 mm, 0.15 mm, 0.2 mm, 0.3 mm, 0.4 mm, 0.5 mm, 0.6 mm, 0.7 mm, 0.8 mm, 0.9 mm, any value therebetween, or fall within a range having any endpoints therein.

Figure 13B:
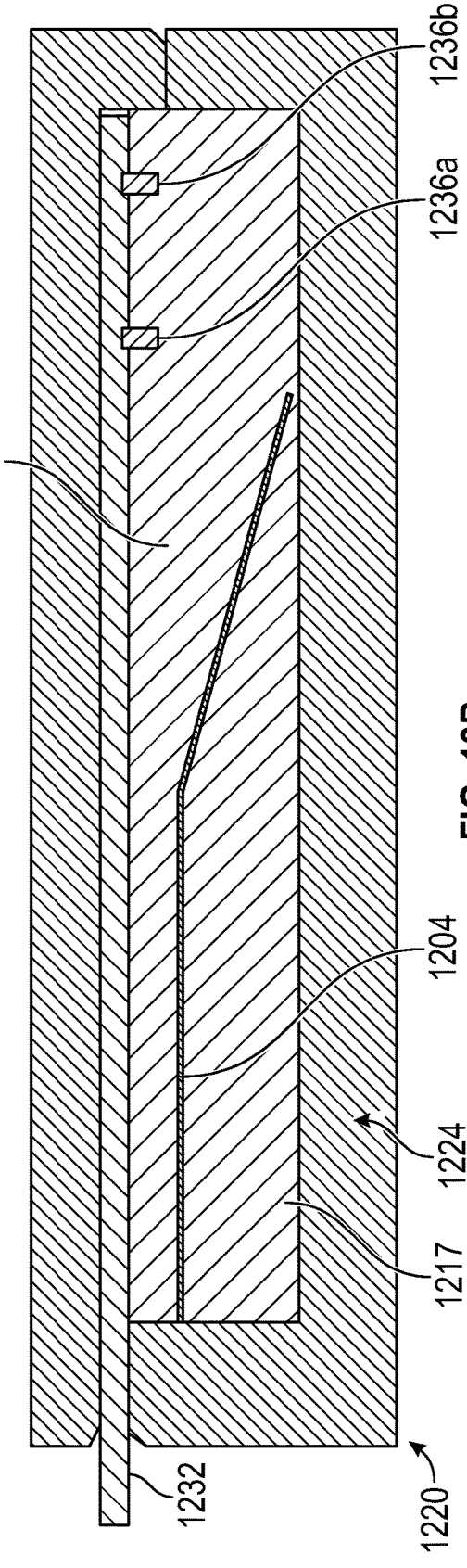
Figure 13C:
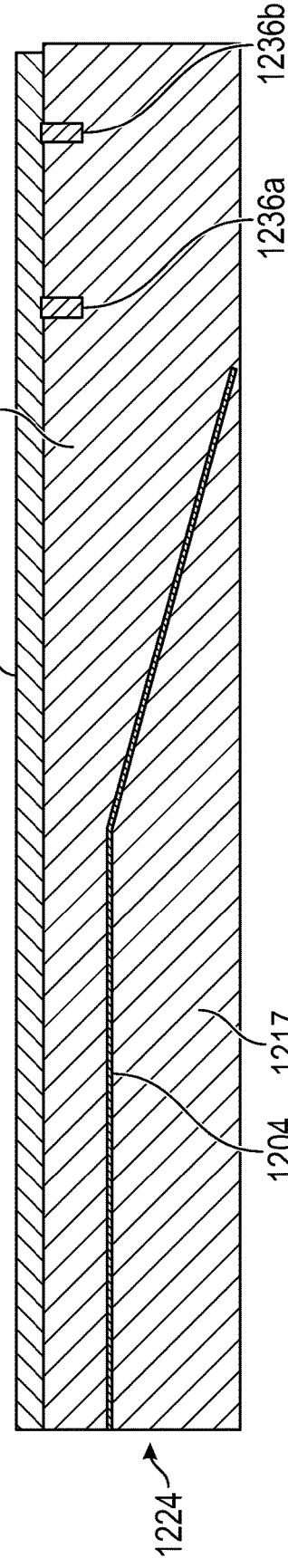

FIG. 13B shows an example process for including the polymer layer 1232 during the second injection molding stage described with reference to FIG. 12D. As shown, the polymer layer 1232 may be disposed within the second mold 1220 prior to injection of the second transparent material 1230. The light sources 1236a, 1236b may be oriented to face the reflective material 1204 so that the light sources 1236a, 1236b become disposed inside the second body 1219. Portion(s) of the polymer layer 1232 that extend outside the bodies 1217, 1219 may be removed. FIG. 13C shows the optical element 1224 after unmolding. The light sources 1236a, 1236b may be arranged such that light emitted passes through the optical element 1224 without being first incident on the reflective material 1204 (which may be reflective of the wavelengths of light emitted by the sources). The light from the light sources 1236a, 1236b can be used to provide cornea glints used for eye tracking.

Example Manufacturing Method

Figure 14:
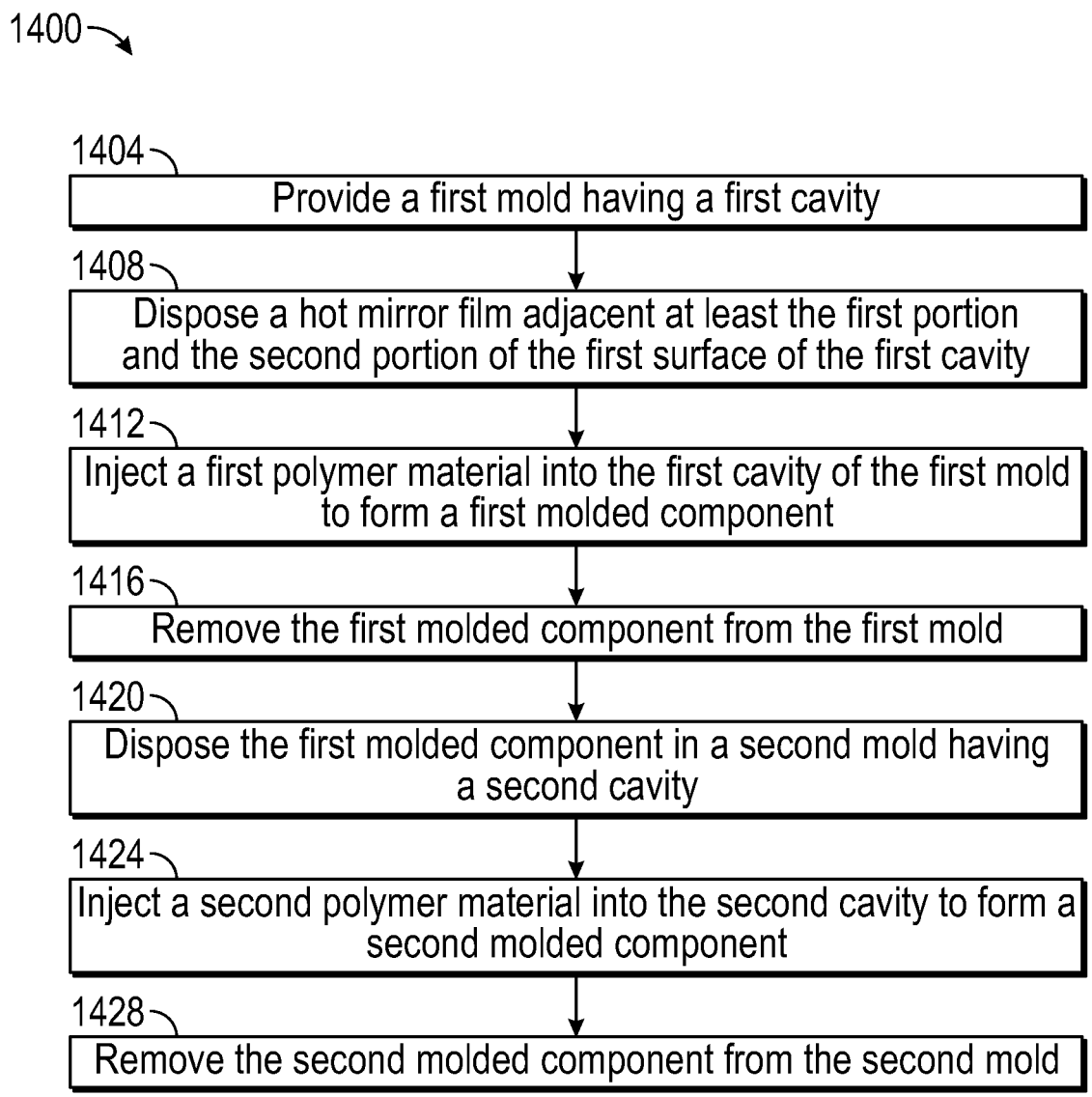
FIG. 14 shows an example method for manufacturing an optical element such as an angularly segmented hot mirror.

FIG. 14 is a flowchart for an example method 1400 for manufacturing an optical element such as an angularly segmented hot mirror. The segmented hot mirror may be injection molded, as described above with reference to FIGS. 12A-13C.

At block 1404, a first mold having a first cavity may be provided. The first cavity can include a first surface having a first portion that is at a non-zero angle relative to a second portion. The angle may be any angle described above, for example, the rise angle 728 or 1228. For example, the angle may range from 2 to 25 degrees or from 5 to 20 degrees.

At block 1408, the method 1400 may include disposing a hot mirror film adjacent at least the first portion and the second portion of the first surface of the first cavity. The hot mirror film can be substantially transmissive to visible light and substantially reflective of infrared light, such as described above. The first mold may include a vent between the first portion and the second portion, which may permit air to be vented from the mold so that the hot mirror film can form a sharp corner 1232.

At block 1412, a first polymer material may be injected into the first cavity of the first mold to form a first molded component (e.g., the intermediate structure 1216a or 1216 described with reference to FIGS. 12B and 12C). At block 1416, the first molded component may be removed from the first mold. The first molded component may include at least a portion of the hot mirror film, for example, as shown in FIGS. 12B and 12C.

At block 1420, the method 1400 may include disposing the first molded component in a second mold having a second cavity. The first molded component can be oriented so that the hot mirror film is disposed toward a central region of the second cavity (see, e.g., FIG. 12D). At block 1424, the method 1400 may include injecting a second polymer material into the second cavity to form a second molded component such that the second polymer material covers at least some of the hot mirror film (see, e.g., FIG. 12D). The first polymer material may be the same as the second polymer material. One or both of the polymers may be substantially transmissive to visible light and infrared light. One or both of the first polymer or the second polymer may include a thermoplastic polymer. An example polymer may comprise a polycarbonate, polymethyl methacrylate (PMMA), and/or any other material described herein related to injectable materials. At block 1428, the second molded component may be removed from the second mold.

The method 1400 may optionally include removing a portion of the hot film that extends outside of the first molded component or the second molded component (see, e.g., FIGS. 12B, 12C). Additionally or alternatively, the method 1400 may include disposing at least one infrared light source in the second cavity of the second mold (see, e.g., FIGS. 13A, 13B). For example, at least one infrared light source may be disposed on a polymer film. The polymer film may include polyethylene terephthalate (PET) and/or any other polymer. The method 1400 may include disposing the polymer film in the second cavity of the second mold.

Although the reflective element can include two portions angled relative to each other, in other embodiments, additional angled portions can be formed. For example, the first surface of the first mold may include a third portion adjacent the second portion, for example, such that the third portion at a second non-zero angle relative to the second portion. The first portion and/or the second portion of the first surface may include curvature, such as one or more curved regions. The one or more curved regions may include different curvatures and/or orientations relative to one another in certain embodiments. As described herein, the method 1400 can include attaching the second molded component to a display for an augmented, mixed, or virtual reality device.

In certain embodiments, a method for manufacturing an optical element can include applying an optical film to a first surface of a first optical element, where the first surface includes a first section and a second section. The second section may be disposed at a non-zero angle relative to the first section. The method may further include applying a second optical element to the first optical element to form the optical element such that the optical film is disposed between the first optical element and the second optical element. The optical film may include one or more features of the hot mirror film, the reflective element 708, and/or the reflective material 1204 described herein.

Additional Aspects

In a 1st aspect, a head mounted display (HMD) configured to be worn on a head of a user is disclosed. the HMD comprises: a frame comprising a pair of ear stems; a pair of optical elements supported by the frame such that each of the pair of optical elements is capable of being disposed forward of an eye of the user; a forward-facing imager mounted to one of the pair of ear stems; and a reflective element disposed in or on one of the pair of optical elements, the reflective element configured to reflect infrared light toward the forward-facing imager, which is configured to receive the infrared light reflected by the reflective element.

In a 2nd aspect, the HMD of aspect 1, wherein each of the pair of optical elements is transparent to visible light.

In a 3rd aspect, the HMD of aspect 1 or aspect 2, wherein each of the pair of optical elements is configured to display an image to the user.

In a 4th aspect, the HMD of aspect 3, wherein each of the pair of optical elements comprises a light field display.

In a 5th aspect, the HMD of aspect 4, wherein the light field display comprises a waveguide stack configured to output the image to the user.

In a 6th aspect, the HMD of any one of aspects 1 to 5, wherein the reflective element comprises a hot mirror, an off-axis diffractive optical element (DOE), an off-axis holographic mirror (OAHM), or an off-axis volumetric diffractive optical element (OAVDOE).

In a 7th aspect, the HMD of any one of aspects 1 to 6, wherein the reflective element is transmissive to visible light.

In a 8th aspect, the HMD of any one of aspects 1 to 7, wherein the reflective element comprises a plurality of segments, and wherein each segment in the plurality of segments has an optical property that is different from an optical property of at least one other segment in the plurality of segments.

In a 9th aspect, the HMD of aspect 8, wherein the optical property includes a reflection angle or an optical power.

In a 10th aspect, the HMD of aspect 8 or aspect 9, wherein the plurality of segments comprises 2, 3, 4, 5, 6, 7, 8, or 9 segments.

In a 11th aspect, the HMD of any one of aspects 1 to 10, wherein the forward-facing imager is mounted to a temple portion of one of the pair of ear stems.

In a 12th aspect, the HMD of any one of aspects 1 to 11, wherein the imager comprises a perspective control lens assembly.

In a 13th aspect, the HMD of aspect 12, wherein the perspective control lens assembly comprises a shift lens, a tilt lens, or a shift-tilt lens.

In a 14th aspect, a display system is disclosed. The display system comprises: an optical element configured to display an image to a user, the optical element configured to be positioned forward an eye of the user; a forward-facing imager; and a reflective element disposed in or on the optical element, the reflective element configured to reflect toward the forward-facing imager infrared light received from the eye of the user.

In a 15th aspect, the display system of aspect 14, wherein the optical element comprises a light field display.

In a 16th aspect, the display system of aspect 14 or 15, wherein the reflective element comprises a hot mirror, an off-axis diffractive optical element (DOE), an off-axis holographic mirror (OAHM), or an off-axis volumetric diffractive optical element (OAVDOE).

In a 17th aspect, the display system of any one of aspects 14 to 16, wherein the reflective element comprises a plurality of segments having different optical power or different reflection angle.

In a 18th aspect, the display system of any one of aspects 14 to 17, further comprising: non-transitory memory configured to store images of the eye of the user obtained by the forward-facing imager; and a hardware processor in communication with the non-transitory memory, the hardware processor programmed to: access the images of the eye; and perform one or more of the following: track the eye of the user; extract biometric information associated with the eye of the user; reconstruct a shape of a portion of the eye of the user; estimate an accommodation state of the eye of the user; or image a retina, an iris, or other element of the eye of the user.

In a 19th aspect, a head mounted display system is disclosed. The HDM comprises: a frame configured to support the display system according to any one of aspects 14 to 18 such that the optical element is positioned forward a first eye of the user.

In a 20th aspect, the head mounted display system of aspect 19, wherein the frame supports a second display system according to any one of aspects 14 to 18 such that the optical element of the second display system is positioned forward a second eye of the user.

In a 21st aspect, an imaging system is disclosed. The imaging system comprises: a reflective element that reflects light in a first wavelength range; and an imager sensitive to light in a non-empty subset of less than all of the first wavelength range, wherein the imager is configured to be oriented to capture light reflected by the reflective element.

In a 22nd aspect, the imaging system of aspect 21, wherein the reflective element comprises a hot mirror, a holographic optical element (HOE), an off-axis holographic mirror (OAHM), or an off-axis volumetric diffractive optical element (OAVDOE).

In a 23rd aspect, the imaging system of any one of aspects 21-22, wherein the first wavelength range comprises an infrared wavelength range.

In a 24th aspect, the imaging system of any one of aspects 21-23, wherein the imaging system comprises an optical element, wherein the optical element comprises the reflected element, and wherein the optical element is transmissive to at least 50% of visible light incident on the optical element.

In a 25th aspect, the imaging system of any one of aspects 21-24, wherein the reflective element comprises a plurality of segments.

In a 26th aspect, the imaging system of aspect 25, wherein a first segment in the plurality of segments has an optical property that is different from an optical property of a second segment in the plurality of segments.

In a 27th aspect, the imaging system of aspect 26, wherein the optical property of the first segment in the plurality of segments or the optical property of the second segment in the plurality of segments comprises a reflection angle or an optical power.

In a 28th aspect, the imaging system of any one of aspects 25-27, wherein the plurality of segments comprises at least two segments.

In a 29th aspect, the imaging system of any one of aspects 25-28, wherein two of the plurality of segments are arranged horizontally.

In a 30th aspect, the imaging system of any one of aspects 25-29, wherein two of the plurality of segments are arranged vertically.

In a 31st aspect, the imaging system of any one of aspects 25-30, wherein some of the plurality of segments are arranged in a grid.

In a 32nd aspect, the imaging system of any one of aspects 21-31, wherein the imager further comprises a perspective control lens assembly.

In a 33rd aspect, the imaging system of aspect 32, wherein the perspective control lens assembly comprises a shift lens, a tilt lens, or a shift-tilt lens.

In a 34th aspect, an imaging system for indirectly capturing an image of an eye of a user is disclosed. The imaging system comprises: a reflective element that reflects light in a first wavelength range, wherein the reflective element comprises an off-axis holographic mirror (OAHM) or an off-axis volumetric diffractive optical element (OAVDOE), and wherein the reflective element is oriented to reflect light propagating from an eye of a user when the imaging system is placed in front of the eye of the user; and an imager sensitive to light in a non-empty subset of less than all of the first wavelength range, wherein the imager is oriented to image an image of the eye of the user by capturing light propagating from the eye of the user reflected by the reflective element.

In a 35th aspect, the imaging system of aspect 34, wherein the image of the eye of the user imaged by the imager and an image of the eye of the user imaged by a camera placed in front of the eye of the user are indistinguishable.

In a 36th aspect, the imaging system of aspect 35, wherein the image of the eye of the user imaged by the imager is effectively imaged by a camera placed in front of the eye of the user.

In a 37th aspect, the imaging system of any one of aspects 35-36, wherein an effective location of the camera placed in front of the eye of the user is at infinity.

In a 38th aspect, the imaging system of any one of aspects 35-37, wherein the first wavelength range comprises an infrared wavelength range.

In a 39th aspect, the imaging system of any one of aspects 35-38, wherein the imaging system comprises an optical element, wherein the optical element comprises the reflected element, and wherein the optical element is transmissive to at least 50% of visible light incident on the optical element.

In a 40th aspect, the imaging system of any one of aspects 35-39, wherein the reflective element comprises a plurality of segments.

In a 41st aspect, the imaging system of aspect 40, wherein a first segment in the plurality of segments has an optical property that is different from an optical property of a second segment in the plurality of segments.

In a 42nd aspect, the imaging system of aspect 41, wherein the optical property of the first segment in the plurality of segments or the optical property of the second segment in the plurality of segments comprises a reflection angle or an optical power.

In a 43rd aspect, the imaging system of any one of aspects 40-42, wherein the plurality of segments comprises at least two segments.

In a 44th aspect, the imaging system of any one of aspects 40-43, wherein two of the plurality of segments are arranged horizontally.

In a 45th aspect, the imaging system of any one of aspects 40-44, wherein two of the plurality of segments are arranged vertically.

In a 46th aspect, the imaging system of any one of aspects 40-45, wherein some of the plurality of segments are arranged in a grid.

In a 47th aspect, the imaging system of any one of aspects 34-46, wherein the imager further comprises a perspective control lens assembly.

In a 48th aspect, the imaging system of aspect 47, wherein the perspective control lens assembly comprises a shift lens, a tilt lens, or a shift-tilt lens.

In a 49th aspect, an imaging system is disclosed. The imaging system comprises: a display comprising a reflective element that reflects light in a first wavelength range, wherein the reflective element comprises a hot mirror, an off-axis holographic mirror (OAHM), or an off-axis volumetric diffractive optical element (OAVDOE); and an imager sensitive to light in the first wavelength range, wherein the imager is configured to be oriented to capture at least light reflected by the reflective element.

In a 50th aspect, the imaging system of aspect 49, wherein the first wavelength range comprises an infrared wavelength range.

In a 51st aspect, the imaging system of aspect 49 or aspect 50, wherein the display is substantially transmissive to visible light.

In a 52nd aspect, the imaging system of any one of aspects 49-51, wherein the reflective element comprises a plurality of segments, wherein each segment in the plurality of segments has an optical property that is different from an optical property of at least one other segment in the plurality of segments.

In a 53rd aspect, the imaging system of aspect 52, wherein the optical property includes a reflection angle or an optical power.

In a 54th aspect, the imaging system of aspect 52 or aspect 53, wherein the plurality of segments comprises 2, 3, 4, 5, 6, 7, 8, or 9 segments.

In a 55th aspect, the imaging system of any one of aspects 49 to 54, wherein the imager further comprises a perspective control lens assembly.

In a 56th aspect, the imaging system of aspect 55, wherein the perspective control lens assembly comprises a shift lens, a tilt lens, or a shift-tilt lens.

In a 57th aspect, the imaging system of any one of aspects 21 to 56, further comprising: non-transitory data storage configured to store imagery acquired by the imager; and a hardware processor in communication with the non-transitory data storage, the hardware processor programmed with executable instructions to analyze the imager to perform one or more of: eye tracking; biometric identification; multiscopic reconstruction of a shape of an eye; estimating an accommodation state of an eye; or imaging a retina, iris, or other distinguishing pattern of an eye.

In a 58th aspect, a head mounted display (HMD) is disclosed. The HMD comprises the imaging system of any one of aspects 21 to 57.

In a 59th aspect, the HMD of aspect 58, wherein the HMD comprises a frame having a portion configured to be worn near an ear, and the imager is disposed near the portion.

In a 60th aspect, the HMD of aspect 58 or aspect 59, wherein the imaging system is configured to image a first eye of a wearer, wherein the HMD comprising a second imaging system of any one of aspects 21 to 57, and wherein the second imaging system configured to image a second eye of the wearer.

In a 61st aspect, the HMD of any one of aspects 58-60, wherein the HMD is an augmented reality device (ARD).

In a 62nd aspect, a method of creating a virtual camera is disclosed. The method comprises: providing an imaging system in front of an object to be imaged to create a virtual camera in front of the object, wherein the imaging system comprises: a reflective element that reflects light in a first wavelength range, wherein the reflective element comprises an off-axis holographic mirror (OAHM) or an off-axis volumetric diffractive optical element (OAVDOE), and wherein the reflective element is oriented to reflect light propagating from the object when the imaging system is placed in front of the object; and an imager sensitive to light in a non-empty subset of less than all of the first wavelength range, wherein the imager is oriented to image an image of the object by capturing light propagating from the object reflected by the reflective element, and wherein the image of the object imaged by the imager and an image of the object imaged by a camera in front of the object are indistinguishable.

In a 63rd aspect, the method of aspect 62, wherein the first wavelength range comprises an infrared wavelength range.

In a 64th aspect, the method of any one of aspects 62-63, wherein the imaging system comprises an optical element, wherein the optical element comprises the reflected element, and wherein the optical element is transmissive to at least 50% of visible light incident on the optical element.

In a 65th aspect, the method of any one of aspects 62-64, wherein the reflective element comprises a plurality of segments.

In a 66th aspect, the method of aspect 65, wherein a first segment in the plurality of segments has an optical property that is different from an optical property of a second segment in the plurality of segments.

In a 67th aspect, the method of aspect 66, wherein the optical property of the first segment in the plurality of segments or the optical property of the second segment in the plurality of segments comprises a reflection angle or an optical power.

In a 68th aspect, the method of any one of aspects 65-67, wherein the plurality of segments comprises at least two segments.

In a 69th aspect, the method of any one of aspects 65-68, wherein two of the plurality of segments are arranged horizontally.

In a 70th aspect, the method of any one of aspects 65-69, wherein two of the plurality of segments are arranged vertically.

In a 71st aspect, the method of any one of aspects 65-70, wherein some of the plurality of segments are arranged in a grid.

In a 72nd aspect, the method of any one of aspects 62-71, wherein the imager further comprises a perspective control lens assembly.

In a 73rd aspect, the method of aspect 72, wherein the perspective control lens assembly comprises a shift lens, a tilt lens, or a shift-tilt lens.

In a 74th aspect, a method of imaging an object using a virtual camera is disclosed. The method comprises: providing an imaging system in front of an object to be imaged to create a virtual camera in front of the object, wherein the imaging system comprises: a reflective element that reflects light in a first wavelength range, wherein the reflective element comprises an off-axis holographic mirror (OAHM) or an off-axis volumetric diffractive optical element (OAVDOE), and wherein the reflective element is oriented to reflect light propagating from the object when the imaging system is placed in front of the object; and an imager sensitive to light in a non-empty subset of less than all of the first wavelength range, wherein the imager is oriented to image an image of the object by capturing light propagating from the object reflected by the reflective element; and imaging the object using the virtual camera, comprising: imaging the image of the object by capturing the light propagating from the object reflected by the reflective element, and wherein the image of the object imaged by the imager and an image of the object imaged by a camera in front of the object are indistinguishable.

In a 75th aspect, the method of aspect 74, wherein the first wavelength range comprises an infrared wavelength range.

In a 76th aspect, the method of any one of aspects 74-75, wherein the imaging system comprises an optical element, wherein the optical element comprises the reflected element, and wherein the optical element is transmissive to at least 50% of visible light incident on the optical element.

In a 77th aspect, the method of any one of aspects 74-76, wherein the reflective element comprises a plurality of segments.

In a 78th aspect, the method of aspect 77, wherein a first segment in the plurality of segments has an optical property that is different from an optical property of a second segment in the plurality of segments.

In a 79th aspect, the method of aspect 78, wherein the optical property of the first segment in the plurality of segments or the optical property of the second segment in the plurality of segments comprises a reflection angle or an optical power.

In a 80th aspect, the method of any one of aspects 77-79, wherein the plurality of segments comprises at least two segments.

In a 81st aspect, the method of any one of aspects 77-80, wherein two of the plurality of segments are arranged horizontally.

In a 82nd aspect, the method of any one of aspects 77-81, wherein two of the plurality of segments are arranged vertically.

In a 83rd aspect, the method of any one of aspects 77-82, wherein some of the plurality of segments are arranged in a grid.

In a 84th aspect, the method of any one of aspects 74-83, wherein the imager further comprises a perspective control lens assembly.

In a 85th aspect, the method of aspect 84, wherein the perspective control lens assembly comprises a shift lens, a tilt lens, or a shift-tilt lens.

In a 86th aspect, an imaging assembly is disclosed. The imaging assembly comprises a see through element (e.g., a display), a viewing camera placed so as to view the display, a lens associated with that camera, and a reflective element on the display which renders the display reflective to all or some of the wavelengths to which the display is sensitive.

In a 87th aspect, the assembly of aspect 86, wherein the reflective element comprises a hot mirror, an off-axis holographic mirror (OAHM) or an off-axis volumetric diffractive optical element (OAVDOE).

In a 88th aspect, the assembly of any one of aspects 86-87, wherein the assembly is integrated into a wearable structure such as a pair of glasses or helmet.

In a 89th aspect, the assembly of any of aspects 86-88, wherein the reflective element is segmented.

In a 90th aspect, the assembly of aspect 89, wherein the assembly is configured for use of a segmented OAHM to select the best possible viewing angle for a particular task (e.g., gaze tracking, or biometric identification).

In a 91st aspect, the assembly of any one of aspects 89-90, wherein the assembly is configured for use of a multiplicity of segment sub-images for stereoscopic or multiscopic three dimensional reconstruction of a shape of an eye.

In a 92nd aspect, the assembly of aspect 91, wherein the three dimensional reconstruction of the shape of the eye is used for estimating the accommodation state of the eye.

In a 93rd aspect, the assembly of aspect 92, wherein estimating the accommodation state of the eye comprises comparing an apparent location and shape of a pupil and iris of the eye across multiple images of a same wearer of the assembly.

In a 94th aspect, the assembly of any one of aspects 92-93, wherein estimating the accommodation state of the eye is used to determine a magnification state of the lens.

In a 95th aspect, the assembly of any one of aspects 86-94, wherein the assembly is configured for use of the image segments as input to an information fusion algorithm.

In a 96th aspect, the assembly of aspect 95, the information fusion algorithm is used to improve the apparent resolution of, or quality of information extraction from, the eye.

In a 97th aspect, the assembly of any one of aspects 95-96, wherein the information fusion algorithm comprises an image super-resolution technique.

In a 98th aspect, the assembly of any one of aspects 95-97, wherein the information fusion algorithm is used to improve an image of an iris of the eye In a 99th aspect, the assembly of any one of aspects 95-98, wherein the information fusion algorithm comprises Iris-Code extraction (e.g., John Daugman, et al. 2006) and a subsequent fusion of resulting Iris-Codes to form a single estimate of the Iris-Code of the wearer.

In a 100th aspect, the assembly of any of aspects 86-99, wherein the assembly is configured for use of the image segments for improving eye pose estimation or tracking.

In a 101st aspect, the assembly of aspect 100, wherein the three dimensional reconstruction of the eye, iris, pupil, and cornea (or any subset of these) is used with the image segments directly for improving coverage of the eye in pose estimation.

In a 102nd aspect, the assembly of any one of aspects 86-101, wherein the reflective element comprises an OAV-DOE including optical power to add or reduce beam divergence.

In a 103rd aspect, the assembly of any one of aspects 86-102, wherein the reflective element includes any number of segments (e.g., two, three, six, or nine segments).

In a 104th aspect, the assembly of any one of aspects 86-103, wherein the reflective element is configured to reflect infrared light and the viewing camera is sensitive to infrared light.

In a 105th aspect, the assembly of aspect 104, wherein the reflective element comprises a hot mirror configured to reflect in the infrared but otherwise transparent to visible light.

In a 106th aspect, the assembly of any one of aspects 86-105, further comprising an offset lens (e.g., as in tilt-shift photography) with a normal to the viewing camera parallel to a normal of the surface comprising the reflective element.

In a 107th aspect, a head mounted display (HMD) is disclosed. The HMD comprises a pair of displays, wherein each display comprises the imaging assembly of any one of aspects 86-106, and wherein one assembly of the pair is configured for each eye of the wearer.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of manufacturing a segmented hot mirror, the method comprising:
   providing a first mold including a first portion and a second portion that form a first cavity, the first portion comprising a first surface and a second surface, wherein the first surface is adjacent to the second surface and forms a non-zero angle relative to the second surface, and wherein the non-zero angle is in a range from 2 degrees to 25 degrees, the second portion comprising a third surface that is opposite to the first surface of the first portion and substantially flat, wherein the third surface is substantially parallel to the first surface of the first portion;
   disposing a hot mirror film adjacent to at least the first surface and the second surface of the first portion of the first mold;
   injecting a first polymer material into the first cavity of the first mold to form a first molded component comprising a first component surface and a second component surface opposite the first component surface, wherein the first component surface is a segmented surface that includes a first segment and a second segment, wherein the first segment conforms to the first surface of the first portion and the second segment conforms to the second surface of the first such that the first segment forms the non-zero angle relative to the second segment, and wherein the second component surface conforms to the third surface of the second portion of the first mold such that the second component surface is substantially flat and substantially parallel to the first segment of the first component surface;
   removing the first molded component from the first mold, wherein at least a portion of the hot mirror film is disposed on the segmented surface of the first molded component and is removed from the first mold with the first molded component;
   disposing the first molded component, with at least the portion of the hot mirror film, in a second mold having a second cavity;
   injecting a second polymer material into the second cavity to form a second molded component, the second polymer material covering at least the portion of the hot mirror film; and
   removing the second molded component from the second mold to provide the segmented hot mirror that comprises: the first molded component, the second molded component, and at least the portion of the hot mirror film that is between the first molded component and the second molded component and that is disposed on the segmented surface of the first molded component.

2. The method of claim 1, wherein the non-zero angle is about 15 degrees.

3. The method of claim 1, wherein the non-zero angle is in a range from 5 degrees to 20 degrees.

4. The method of claim 1, wherein the hot mirror film is substantially transmissive to visible light and substantially reflective of infrared light.

5. The method of claim 1, wherein the hot mirror film is substantially transmissive to light in a first wavelength range from 400 nm to 700 nm and substantially reflective of light in a second wavelength range from about 800 nm to 900 nm.

6. The method of claim 1, wherein the first polymer material is the same as the second polymer material.

7. The method of claim 1, wherein at least one of the first polymer material or the second polymer material are substantially transmissive to visible light and infrared light.

8. The method of claim 1, wherein at least one of the first polymer material or the second polymer material comprise a thermoplastic polymer.

9. The method of claim 1, wherein at least one of the first polymer material or the second polymer material comprises polycarbonate or polymethyl methacrylate (PMMA).

10. The method of claim 1, further comprising removing a portion of the hot film that extends outside of the first molded component or the second molded component.

11. The method of claim 1, wherein disposing the first molded component in the second mold having the second cavity comprises orienting the first molded component so that the hot mirror film is disposed toward a central region of the second cavity.

12. The method of claim 1, wherein the first mold comprises a vent between the first portion and the second portion.

13. The method of claim 1, further comprising disposing at least one infrared light source in the second cavity of the second mold.

14. The method of claim 13, wherein the at least one infrared light source is disposed on a polymer film, the method comprising disposing the polymer film in the second cavity of the second mold.

15. The method of claim 14, wherein the polymer film comprises polyethylene terephthalate (PET).

16. The method of claim 1, wherein the first portion of the first mold comprises a third surface adjacent to the second surface, the third surface at a second non-zero angle relative to the second surface.

17. The method of claim 1, wherein the second surface of the first portion comprises at least one curved region.

18. The method of claim 1, further comprising attaching the second molded component to a display for an augmented, mixed, or virtual reality device.

19. The method of claim 1, further comprising:
incorporating the segmented hot mirror into a wearable display device by adhering or attaching the segmented hot mirror to an optical display element included in the wearable display device,
wherein portions of the hot mirror film on the first segment and the second segment are positioned to image an eye of a wearer of the wearable display device from different angular locations that respectively correspond to different angular orientations of the first segment and the second segment.

* * * * *